United States Patent
Kong et al.

(10) Patent No.: US 9,763,054 B2
(45) Date of Patent: Sep. 12, 2017

(54) SYSTEMS AND METHODS FOR DETERMINING LOCATIONS OF WIRELESS SENSOR NODES IN A TREE NETWORK ARCHITECTURE HAVING MESH-BASED FEATURES

(71) Applicant: Dragonfly Technology Inc., San Bruno, CA (US)

(72) Inventors: Lingkai Kong, Palo Alto, CA (US); Teymur Bakhishev, San Jose, CA (US); Tommi Ylamurto, Los Gatos, CA (US); Vivek Subramanian, Orinda, CA (US); Manu Seth, Berkeley, CA (US)

(73) Assignee: LOCIX Inc., San Bruno, CA (US)

( * ) Notice: Subject to any disclaimer, the term of this patent is extended or adjusted under 35 U.S.C. 154(b) by 146 days.

(21) Appl. No.: 14/830,668

(22) Filed: Aug. 19, 2015

(65) Prior Publication Data

US 2017/0055131 A1    Feb. 23, 2017

(51) Int. Cl.
*H04W 4/02* (2009.01)
*H04W 84/18* (2009.01)

(52) U.S. Cl.
CPC .......... *H04W 4/027* (2013.01); *H04W 84/18* (2013.01)

(58) Field of Classification Search
CPC ..... H04W 84/18; H04W 64/00; G01S 5/0289; G01S 5/14; H04L 67/12; H04L 67/18; A61B 2562/0219; A61B 2562/08; A61B 5/0022
See application file for complete search history.

(56) References Cited

U.S. PATENT DOCUMENTS

| | | | |
|---|---|---|---|
| 7,548,576 B2 | 6/2009 | Dowla et al. | |
| 7,574,221 B2 | 8/2009 | Guvenc et al. | |
| 7,962,150 B2 | 6/2011 | Hertzog et al. | |
| 8,289,159 B2 | 10/2012 | Julian et al. | |
| 8,478,292 B2 | 7/2013 | Kim et al. | |
| 2005/0228613 A1* | 10/2005 | Fullerton | G01S 5/0289 342/458 |

(Continued)

OTHER PUBLICATIONS

Ahmed, Khawza I., et al., "Improving Two-Way Ranging Precision with Phase-offset Measurements", In *Global Telecommunications Conference, 2006. GLOBECOM'06. IEEE* (pp. 1-6). IEEE.

(Continued)

*Primary Examiner* — Dung Hong
(74) *Attorney, Agent, or Firm* — Blakely Sokoloff, Taylor & Zafman LLP

(57) ABSTRACT

Systems and methods for determining locations of wireless sensor nodes in a tree network architecture having mesh-based features are disclosed herein. In one embodiment, a system includes a hub having one or more processing units and RF circuitry for transmitting and receiving communications with sensor nodes to enable bi-directional communications. The one or more processing units of the hub execute instructions to configure the system with a tree architecture for communications between the hub and the sensor nodes, to detect a change in range or position of at least one sensor node, and to configure the system temporarily with a mesh-based architecture for determining location information for the sensor nodes based on detecting a change in range or position.

20 Claims, 20 Drawing Sheets

(56) References Cited

U.S. PATENT DOCUMENTS

| | | | | |
|---|---|---|---|---|
| 2007/0217379 | A1* | 9/2007 | Fujiwara | G01S 5/0205 370/338 |
| 2008/0069008 | A1* | 3/2008 | Park | H04W 64/00 370/254 |
| 2009/0147699 | A1* | 6/2009 | Ruy | H04L 29/12254 370/254 |
| 2010/0074133 | A1* | 3/2010 | Kim | G01S 5/0289 370/252 |

OTHER PUBLICATIONS

Baghaei-Nejad, Majid, et al., "Low cost and precise localization in a remote-powered wireless sensor and identification system", *Electrical Engineering (ICEE), 2011 19th Iranian Conference on*, pp. 1-5. IEEE, May 17-19, 2011.

Doherty, Lance, et al., "Convex position estimation in wireless sensor networks", *INFOCOM 2001. Twentieth Annual Joint Conference of the IEEE Computer and Communications Societies. Proceedings. IEEE*, vol. 3, pp. 1655-1663. IEEE, 2001.

Farnsworth, Bradley, et al., "High Precision Narrow-Band RF Ranging", In *Proceedings of the 2010 International Technical Meeting of the Institute of Navigation* (pp. 161-166).

Farnsworth, Bradley, et al., "High-precision 2.4 GHz DSSS RF ranging", *Proceedings of the 2011 International Technical Meeting of the Institute of Navigation.* 2011, 6 pages.

Farnsworth, Bradley D., et al., "Precise, Accurate, and Multipath-Resistant Networked Round-Trip Carrier Phase RF Ranging", *Proceedings of the 2015 International Technical Meeting of the Institute of Navigation,* Dana Point, California, Jan. 2015, pp. 651-656.

Franceschini, Fiorenzo, et al., "A review of localization algorithms for distributed wireless sensor networks in manufacturing", *International journal of computer integrated manufacturing 22*, No. 7 (2009): 698-716.

Gezici, Sinan, et al., "Localization via ultra-wideband radios: a look at positioning aspects for future sensor networks", *Signal Processing Magazine, IEEE 22*, No. 4 (2005): pp. 70-84.

Jin, H. H., "Scalable sensor localization algorithms for wireless sensor networks", *Doctoral dissertation,* University of Toronto, 2005, 106 pages.

Karalar, Tufan, et al., "Implementation of a Localization System for Sensor Networks", (No. UCB/EECS-2006-69). California Univ Berkeley Dept of Electrical Engineering and Computer Science, May 18, 2006, 173 pages.

Konig, S., et al., "Precise time of flight measurements in IEEE 802.11 networks by cross-correlating and sampled signal with a continuous Barker code", In *Mobile Adhoc and Sensor Systems (MASS), 2010 IEEE 7th International Conference on*, pp. 642-649. IEEE, 2010.

Lanzisera, Steven, et al., "RF Ranging for Location Awareness", *Doctoral dissertation,* University of California, Berkeley, May 19, 2009, 103 pages.

Lanzisera, Steven, et al., "RF Time of Flight Ranging for Wireless Sensor Network Localization", *Intelligent Solutions in Embedded Systems, 2006 International Workshop on* , vol., No., pp. 1,12, Jun. 30-30, 2006.

Makki, A., et al., "High-resolution time of arrival estimation for OFDM-based transceivers", *Electronics Letters 51*, No. 3 (2015), pp. 294-296.

Mao, Guoqiang, et al., "Localization Algorithms and Strategies for Wireless Sensor Networks", *IGI Global,* 2009.

Pahlavan, Kaveh, et al., "Indoor Geolocation Science and Technology", *Communications Magazine, IEEE 40*, No. 2 (2002): 112-118.

Patwari, Neal, et al., "Locating the nodes: cooperative localization in wireless sensor networks", *Signal Processing Magazine, IEEE 22*, No. 4 (2005): pp. 54-69.

Planas, Andreu U., "Signal processing techniques for wireless locationing", Barcelona, Technical University of Catalonia (2006).

Savarese, Chris, et al., "Location in distributed ad-hoc wireless sensor networks", *Acoustics, Speech, and Signal Processing, 2001. Proceedings.(ICASSP'01). 2001 IEEE International Conference on,* vol. 4, pp. 2037-2040. IEEE, 2001.

Schmid, Thomas, et al., "Disentangling wireless sensing from mesh networking", *Proceedings of the 6th Workshop on Hot Topics in Embedded Networked Sensors,* p. 3. ACM, Jun. 28, 2010.

Song, Liang, et al., "Matrix pencil for positioning in wireless ad hoc sensor network", In *Wireless Sensor Networks*, pp. 18-27. *Springer Berlin Heidelberg,* 2004.

Vasisht, Deepak, et al., "Sub-Nanosecond Time of Flight on Commercial Wi-Fi Cards", *arXiv preprint* arXiv:1505.03446 (2015), 14 pages.

Vera, Jesus S., "Efficient Multipath Mitigation in Navigation System", *Ph. D. dissertation,* Universitat Politecnica de Catalunya. Dec. 9, 2003, 158 pages.

Wibowo, Sigit B., et al., "Time of flight ranging using off-the-self ieee802. 11 wifi tags", *Proceedings of the International Conference on Positioning and Context-Awareness (PoCA'09).* 2009, 5 pages.

Yang, Zheng, et al., "From RSSI to CSI: Indoor localization via channel response", *ACM Computing Surveys (CSUR) 46*, No. 2 (2013), article 25, 32 pages.

* cited by examiner

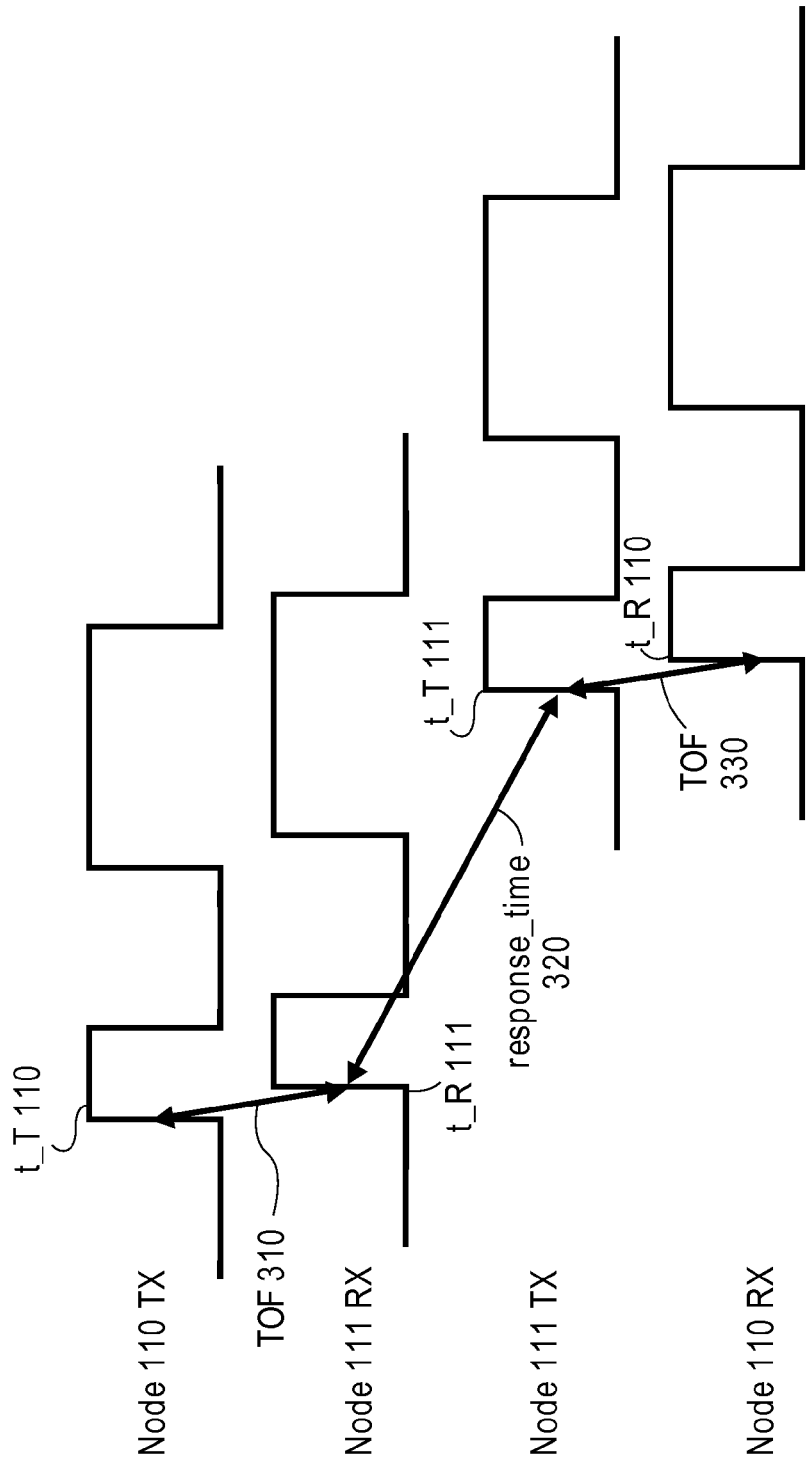

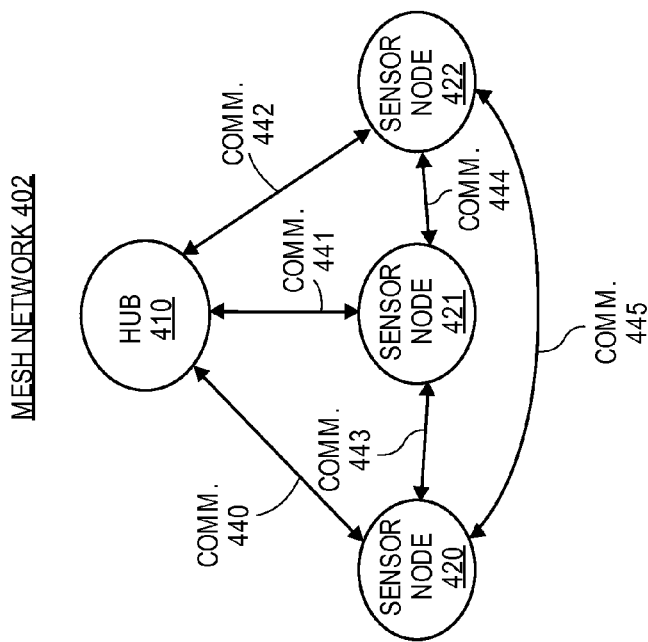
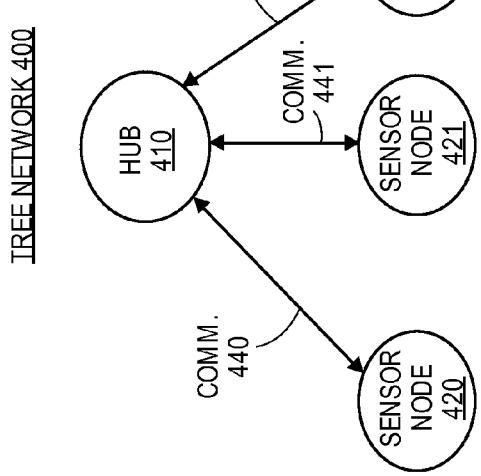
FIG. 4

SYSTEMS AND METHODS FOR DETERMINING LOCATIONS OF WIRELESS SENSOR NODES IN A TREE NETWORK ARCHITECTURE HAVING MESH-BASED FEATURES

RELATED APPLICATIONS

This application is related to application Ser. No. 14/607,050, filed Jan. 27, 2015, entitled: SYSTEMS AND METHODS FOR DETERMINING LOCATIONS OF WIRELESS SENSOR NODES IN AN ASYMMETRIC NETWORK ARCHITECTURE and application Ser. No. 14/830 671, filed Aug. 19, 2015, entitled SYSTEMS AND METHODS FOR DETERMINING LOCATIONS OF WIRELESS SENSOR NODES IN A NETWORK ARCHITECTURE HAVING MESH-BASED FEATURES FOR LOCALIZATION.

FIELD

Embodiments of the invention pertain to systems and methods for determining locations of wireless sensor nodes in a tree network architecture having mesh-based features.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications. For example, in wireless sensor networks, knowledge of location can add context to sensed data. In one example, knowledge of location in temperature sensing networks can enable mapping of temperature variations. Thus, it is desirable for systems and methods to enable location detection of nodes in wireless networks. Prior art wireless localization systems typically operate by measuring time of flight for wireless transmission between nodes to estimate distance. Still other prior art wireless localization systems operate by measuring incident signal strength and using this information to estimate distance between transmitting and receiving nodes. The individual distances between multiple different pairs of nodes are then used to estimate the relative position of each individual node through triangulation. Unfortunately, this process can have several problems. First, in low power environments in which nodes are not transmitting and receiving very often, the localization process can be slow or impossible; on the other hand, fast, accurate, and robust localization may consume too much power due to the need to transmit repetitive bursts of data. Second, in tree-like networks, triangulation may not be possible due to the inability to establish a sufficient number of path lengths between node pairs. Third, in indoor environments, limited precision of localization may prevent determination of the specific room in which a particular node is located; for example, the available precision may prevent determination of which side of a wall on which a particular node is located.

SUMMARY

For one embodiment of the present invention, systems and methods for determining locations of wireless sensor nodes in a tree network architecture having mesh-based features are disclosed herein.

In one example, a system includes a hub for monitoring sensor nodes in a wireless network architecture. The hub includes one or more processing units and RF circuitry for transmitting and receiving communications in the wireless network architecture. The sensor nodes each have a wireless device with a transmitter and a receiver to enable bi-directional communications with the hub in the wireless network architecture. The one or more processing units of the hub execute instructions to configure the system with a tree architecture for communications between the hub and the sensor nodes, to detect a change in range or position of at least one sensor node, to configure the system temporarily with a mesh-based architecture for determining location information for the plurality of sensor nodes based on detecting a change in range or position.

In another example, a computer-implemented method for localization of nodes in a wireless network includes causing, with processing logic of a hub, the wireless network having nodes to be configured as a mesh-based network architecture for a time period. The computer-implemented method includes determining, with the processing logic of the hub, localization of at least two nodes using at least one of time of flight and signal strength techniques. Upon localization of the at least two nodes being complete, terminating, with the processing logic of the hub, time of flight measurements if any time of flight measurements are occurring. The computer-implemented method further includes causing, with the processing logic of the hub, the wireless network to be configured in a tree based or tree-like network architecture upon completion of localization.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 3 illustrates transmitting and received signals between nodes for estimating time of flight in accordance with one embodiment.

FIG. 4 illustrates a system capable of having a tree network architecture and a mesh network architecture in accordance with one embodiment.

DETAILED DESCRIPTION

Figure 1:
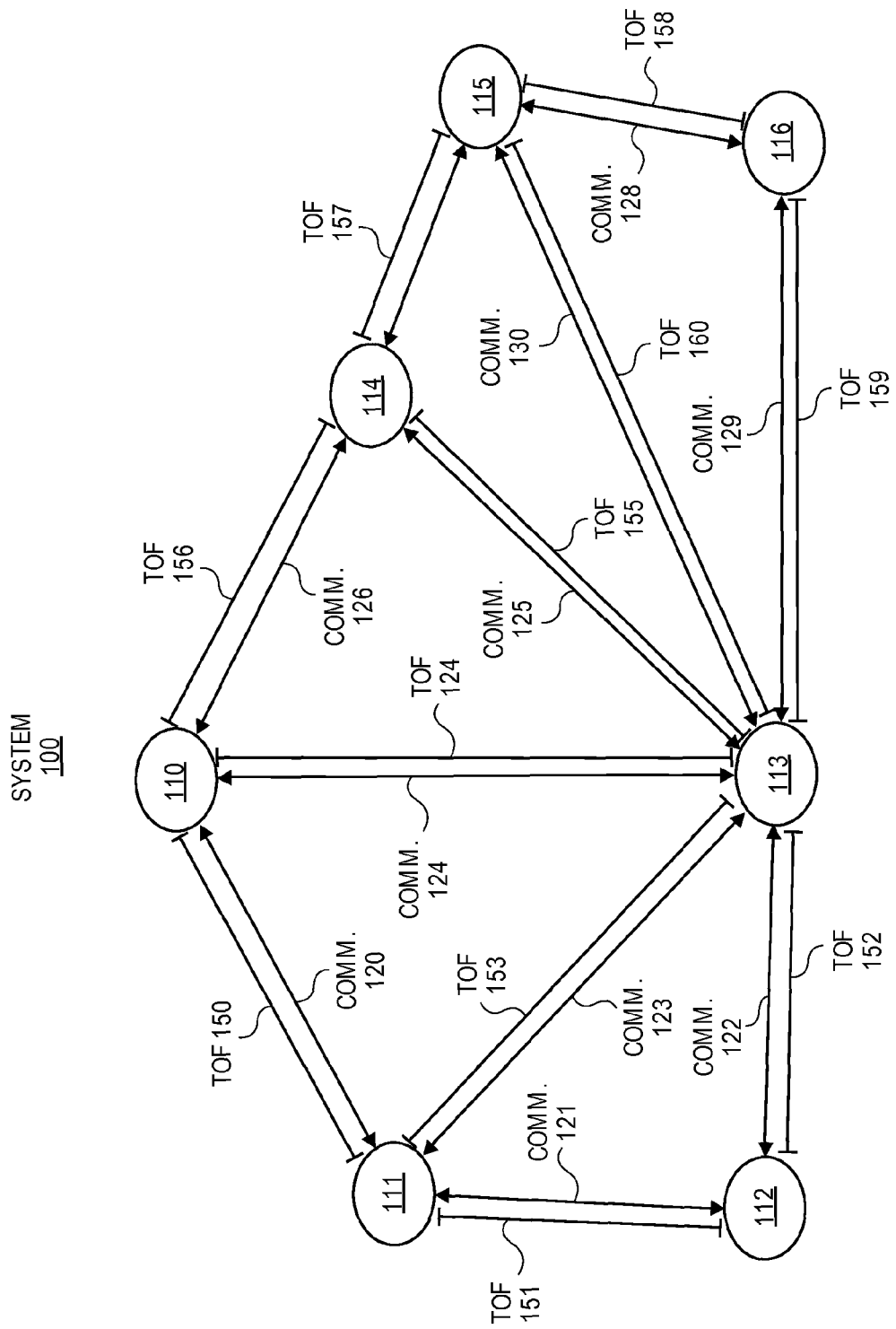
FIG. 1 illustrates an exemplar system of wireless nodes in accordance with one embodiment.

Systems and methods for determining locations of wireless sensor nodes in a tree network architecture having mesh-based features are disclosed herein. In one example, a system includes a hub for monitoring sensor nodes in a wireless network architecture. The hub includes one or more processing units and RF circuitry for transmitting and receiving communications in the wireless network architecture. The sensor nodes each have a wireless device with a transmitter and a receiver to enable bi-directional communications with the hub in the wireless network architecture. The one or more processing units of the hub execute instructions to configure the system with a tree architecture for communications between the hub and the sensor nodes, to detect a change in range or position of at least one sensor node, to configure the system temporarily with a mesh-based architecture for determining location information for the plurality of sensor nodes based on detecting a change in range or position.

Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication. The wireless sensor network of the present design improves detection of walls and indoor obstructions, thus enabling estimation of correct room context by using a combination of both signal strength and time of flight to estimate presence of walls and obstructions. The wireless sensor network of the present design exploits other sensor modalities such as image detection, magneto-metric detection, and illumination detection in conjunction with wireless localization to improve accuracy and contextualization of localization.

The wireless sensor network of the present design exploits stationary objects such as appliances powered by the electrical mains as one or more of the nodes for path length detection to enabling tethered estimation of position. The wireless sensor network of the present design saves energy of localization by using periodic low-energy signal strength estimates to detect changes in position, and, upon detection of a change in position, uses higher energy full time of flight-based triangulation-based estimation to re-map the network when needed. The wireless sensor network of the present design improves localization accuracy by using multiple frequency channels to improve channel quality, either sequentially or together, thus enabling higher accuracy of localization estimation. The wireless sensor network of the present design improves localization accuracy by using angle-of-arrival estimation that is achieved via use of multiple antennas on one or more of the nodes to eliminate or reduce spurious localization estimates resulting from reflected signals.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607, 048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

Based on using the time of flight of signals between nodes in a wireless network, it is possible to estimate distance between individual pairs of nodes in a wireless network by exploiting the fact that the speed of signal propagation is relatively constant. Embodiments of the present network architecture allow measuring multiple pairs of path lengths and performing triangulation and then estimating the relative location of individual nodes in three-dimensional space.

FIG. 1 illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated. This process can be repeated multiple times and at multiple frequencies to improve precision and to eliminate or reduce degradation due to poor channel quality at a specific frequency. A set of path lengths can be estimated by repeating this process for various node pairs. For example, in FIG. 1, the path lengths are TOF 150-160. Then, by using a geometric model, the relative position of individual nodes can be estimated based on a triangulation-like process.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

Figure 2A:
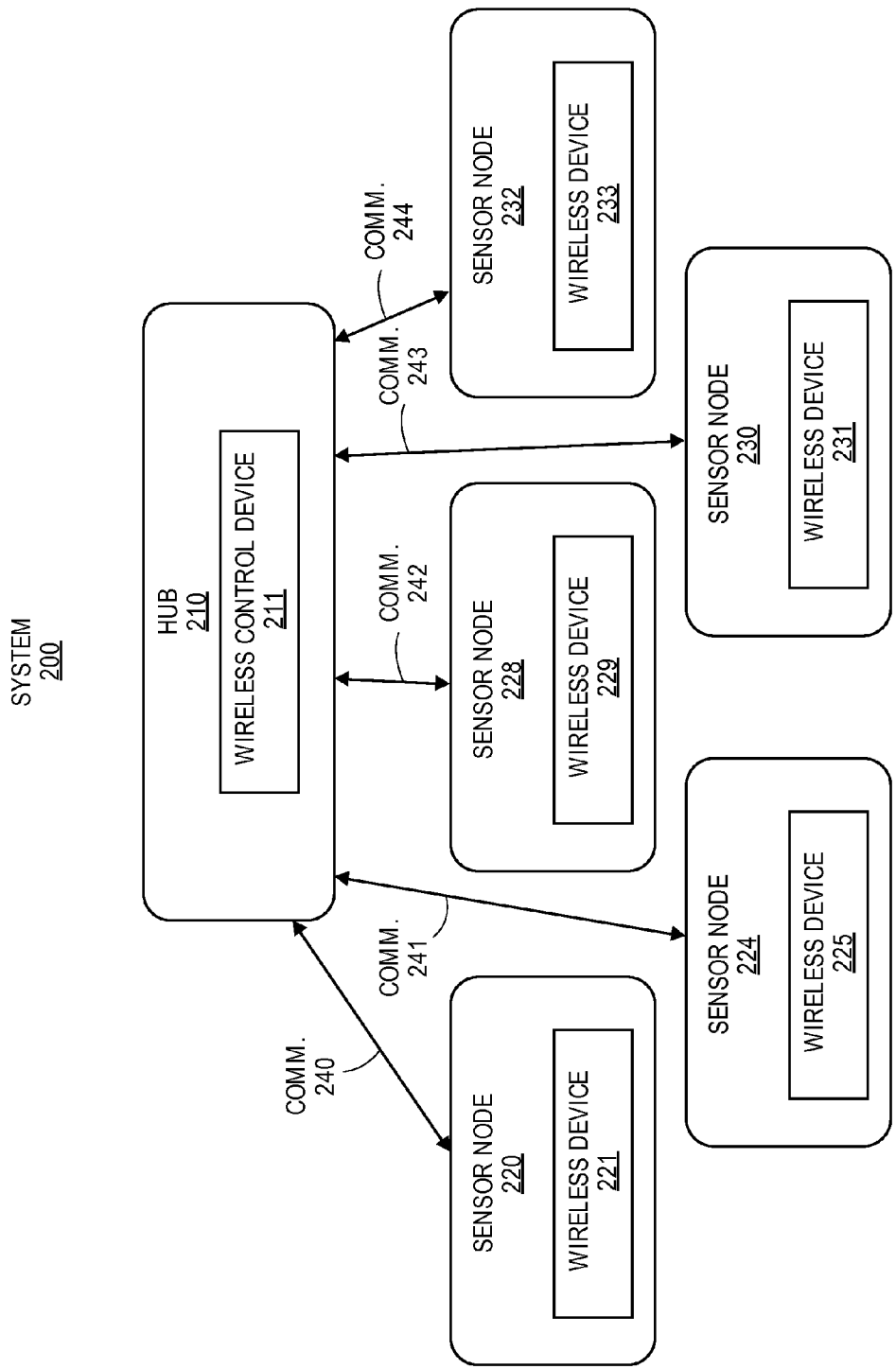
FIG. 2A shows a system primarily having a tree network architecture that is capable of mesh-like network functionality in accordance with one embodiment.

FIG. 2A shows a system primarily having a tree network architecture that is capable of mesh-like network functionality in accordance with one embodiment. The system 200 primarily has a tree network architecture for standard communications (e.g., (e.g., node identification information, sensor data, node status information, synchronization information, localization information, other such information for the wireless sensor network, time of flight (TOF) communications, etc.). The system 200 includes a hub 210 having a wireless control device 211, a sensor node 220 having a wireless device 221, a sensor node 224 having a wireless device 225, a sensor node 228 having a wireless device 229, a sensor node 230 having a wireless device 231, and a sensor node 232 having a wireless device 233. Additional hubs which are not shown can communicate with the hub 210 or other hubs. Each hub communicates bi-directionally with the sensor nodes 220, 224, 228, 230, and 232. The hubs are also designed to communicate bi-directionally with other devices (e.g., client device, mobile device, tablet device, computing device, smart appliance, smart TV, etc.).

A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the hub 210 communicates with nodes 220, 224, 228, 230, and 232. These communications include bi-directional communications 240-244 in the wireless asymmetric network architecture. The hub having the wireless control device 7211 is configured to send communications to other hubs and to receive communications from the other hubs for controlling and monitoring the wireless asymmetric network architecture.

Figure 2B:
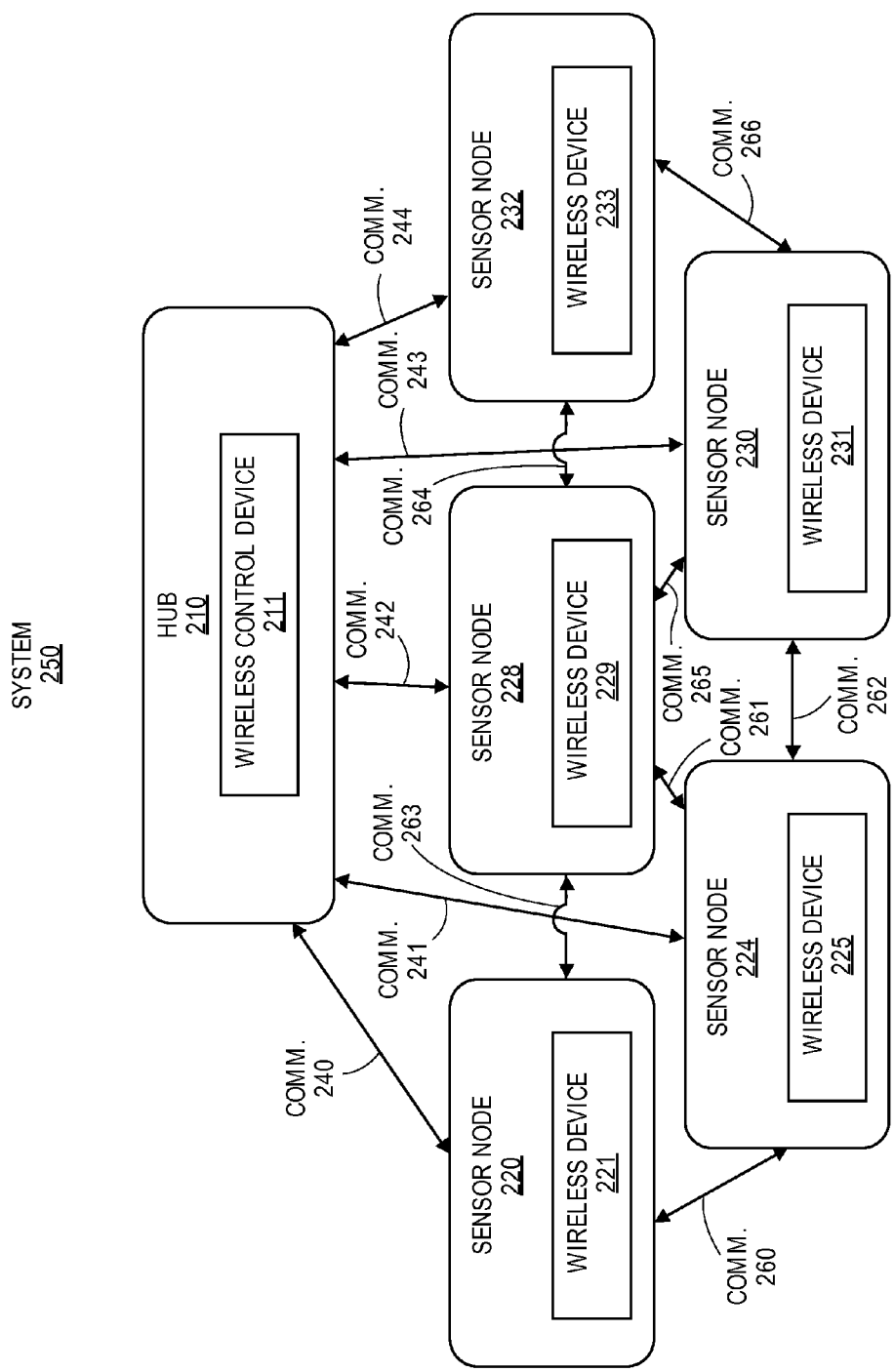
FIG. 2B shows a system primarily having a tree network architecture that is capable of mesh-like network functionality in accordance with one embodiment.

FIG. 2B shows a system primarily having a tree network architecture that is capable of mesh-like network functionality in accordance with one embodiment. The system 250 establishes a mesh-like network architecture for determining location of the hub and sensor nodes based on a threshold criteria (e.g., movement of at least one node by a certain distance, a change in path length between a node and the hub by a certain distance) being triggered. The system 250 includes similar components such as hub 210 and nodes 220, 224, 228, 230, and 232 of FIG. 2A. The hub 210 includes the wireless device 211, the sensor node 220 includes the wireless device 221, the sensor node 224 includes the wireless device 225, the sensor node 228 includes the wireless device 229, the sensor node 230 includes the wireless device 231, and the sensor node 232 includes the wireless device 233. Additional hubs which are not shown can communicate with the hub 210 or other hubs. The hub 210 communicates bi-directionally with the sensor nodes 220, 224, 228, 230, and 232.

In one embodiment, the hub 210 communicates with nodes 220, 224, 228, 230, and 232. These communications include bi-directional communications 240-244 in the wireless asymmetric network architecture. The sensor nodes communicate bi-directionally with each other based on communications 261-266 to provide the mesh-like functionality for determining locations of the hub and sensor nodes.

The estimation of time of flight can be implemented in several ways. In a first embodiment, a zero crossing on the transmitted and received signals are used to estimate time of flight. FIG. 3 illustrates transmitting and receiving signals between nodes for estimating time of flight in accordance with one embodiment. In this system, the precision of location is limited by the frequency of the signal. Higher frequencies provide finer time granularity of zero crossing, thus allowing for more precise estimation of time of flight. For the transmitting and received signals as illustrated in FIG. 3, Node 110 transmits a Node 110 transmit (TX) signal at time t_T110; this timing information may be encoded into the packet itself, for example. Node 111 receives a Node 111 receive (RX) signal at time t_R111. The time of flight (TOF) 310 for this transaction is the t_R111 minus t_T110.

Node 111 then performs internal operations (such as, for example, calculating the time of flight and encoding it into a return transmission packet, as well as encoding an expected time of transmission, t_T111) and sends a return transmission (Node 111 TX) at time t_T111. This is received at time t_R111 at node 110. The time of flight (TOF) 330 is then time t_R110 minus time t_T111. A response time 320 is a time of r_T111 minus a time of t_R111. The average time of flight is then calculated based on the two-way transmission. Since the individual clocks of Nodes 110 and 111 may not be synchronized, the use of a two-way transmission allows time of flight estimation without required clock synchronization.

In one example, a time of t_T110 and a time of t_R110 is measured at node 110. A time of t_T111 and a time of t_R111 is measured at node 111. An average time of flight (TOF)= ((t_R110−t_T110)−(t_T111−t_R111))/2

Note that the precision of estimation is also limited by the sampling bandwidth of the radios used. If the precision of the estimation is insufficient based on the clock frequency (and thus the associated sampling bandwidth) of the radios used, a correlator may be used to obtain a higher effective precision. In such an embodiment, interpolation of a peak position is performed using a correlation operation to find the effective actual arrival time, despite the fact that the sample rate limits the accuracy of the timing measurement. This is done by making multiple measurements.

In indoor environments, use of high-frequencies for communication in a tree network can be problematic due to the increased attenuation that occurs at high frequencies in real environments. This necessitates the use of higher power transmitters, which may be undesirable for minimizing power consumption. Therefore, in one embodiment of this invention, communication is performed using a tree-like network at lower frequencies (for example, 900 MHz or 2.4 GHz), while localization is performed using a mesh network at higher frequencies (for example, 5 GHz or higher).

FIG. 4 illustrates a system capable of having a tree network architecture and a mesh network architecture in accordance with one embodiment. During communications operations with no ranging or location operations, a tree network architecture 400 includes a hub 410 and sensor nodes 420-422. The hub communicates with the sensor nodes based on bi-directional communications 440-442. In one example, a radio (e.g., a 900 MHz radio, 5 GHz radio) in each node is used to transmit and receive data. Despite the use of a tree network architecture 400 involving longer distances of transmission, the lower attenuation that occurs at 900 MHz allows for reduced overall power consumption during transmission. The 900 MHz transmission may be used for coarse time of flight or signal strength estimations and may be used to trigger re-mapping as discussed with reference to FIGS. 2A and 2B.

In an alternative embodiment, a higher frequency radio (e.g., 5 GHz radio) may be used periodically to provide higher precision time of flight estimation between the hub and the nodes in the tree network architecture. This may be implemented as a higher frequency radio (e.g., 5 GHz) in each direction or as a higher frequency radio (e.g., 5 GHz) from the hub to the node and 900 MHz from the node to the hub, for example. Since the hub may have plenty of available power, being connected to electrical mains, while the nodes may be power-constrained, being battery operated, the use of such an architecture can reduce battery consumption in the nodes while providing acceptably high-precision of localization when needed.

Upon a range change 430 between nodes and the hub, the tree network architecture is configured as a mesh-based network architecture 402 temporarily for localization of the nodes. The mesh-based network architecture 402 includes the hub 410 and sensor nodes 420-422. The hub communicates with the sensor nodes based on bi-directional communications 440-445. After localization is completed, the mesh-based network architecture 402 can be configured as the tree network architecture 400 for standard communications.

In one embodiment of this invention, one or more of the wireless nodes or hubs could be in a fixed and known location. This could conveniently be the hub, or could be one or more of the nodes as well. In this embodiment, since one of the members (e.g., hub, nodes) of the network is in a known location, once the localization algorithm is completed to determine relative locations of all the nodes, the real location of each node can be estimated since one of the nodes is known and the relative position of every other node to this known reference is known as well.

Figure 5:
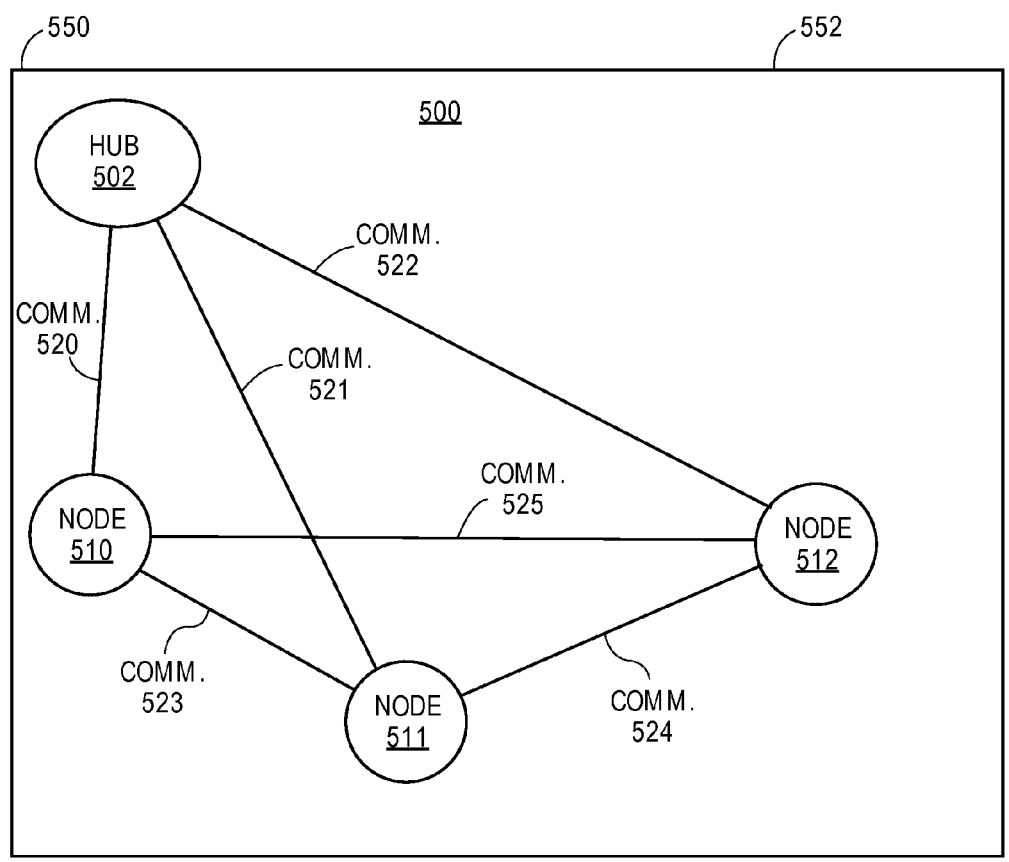
FIG. 5 illustrates a network architecture for determining locations of nodes in accordance with one embodiment.

FIG. 5 illustrates a network architecture for determining locations of nodes in accordance with one embodiment. The network architecture 500 includes a hub 502, and nodes 510-512. The hub 502 and nodes 510-512 communicate bi-directionally using communications 520-525. In one example, the hub 502 is in a fixed and known location, for example, in a corner 550 of a known room 552. In alternative embodiments, the hub could be contained within a known appliance such as a smart thermostat, a smart refrigerator, or other such devices as would be apparent to one of skill in the art. Time of flight and triangulation is used to estimate the relative distance of each node from the known hub, which in turn allows for estimation of the absolute position of each node of the wireless sensor network.

In addition to time of flight, another method of obtaining information about the distance between wireless radios is based on a measurement of the signal strength. If the attenuation factor of the medium between the transmitter and receiver is known, then it is possible to estimate the separation between the nodes by knowing the transmitted and received signal strengths. Analogous algorithms in comparison to signal strength estimation as disclosed in embodiments of this invention and based on time of flight estimation can also be implemented.

One disadvantage of using signal strength is that the attenuation factor depends strongly on the material in the signal transmission path. For example, attenuation in walls such as concrete is typically higher than attenuation in air. Therefore, it is generally desirable to use time of flight for distance estimation rather than signal strength, since time of flight provides a more robust method for distance estimation, independent of the presence of walls, etc. On the other hand, time of flight is sensitive to multi-path issues. For example, if the direct path between two radios is largely blocked (for example, by a highly attenuating wall) but a path exists off-axis between the two radios, then it is possible that a reflected signal will reach the receiving radio rather than the direct path signal. In this instance, the estimated distance will be longer due to the longer time of flight associated with the reflection. If this longer time of flight is used to triangulate, this can result in an erroneous node map. In one embodiment of this invention, both signal strength and time of flight are used for distance estimation.

Figure 6:
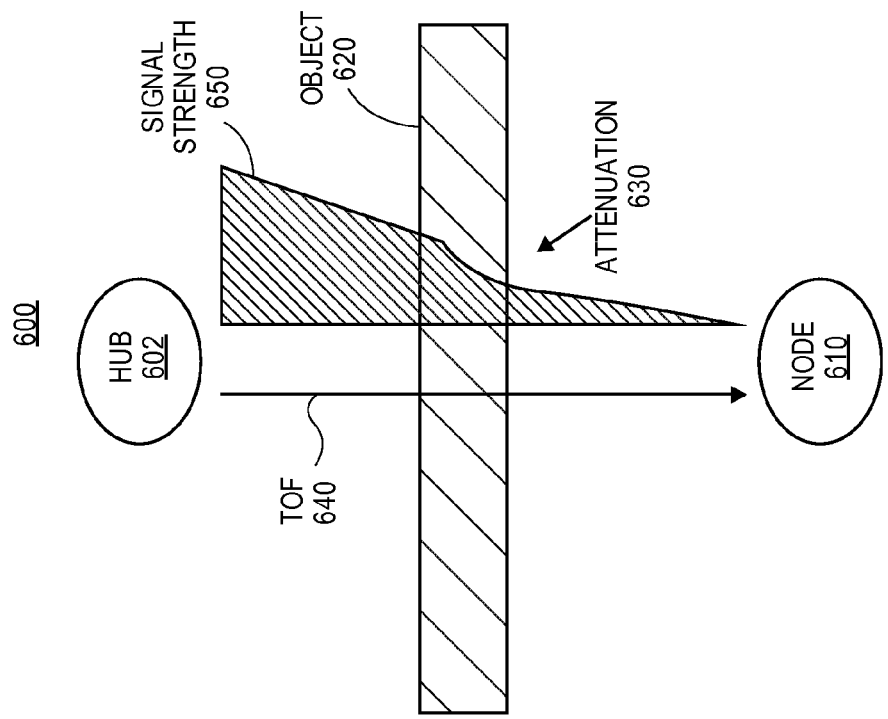
FIG. 6 illustrates a network architecture for identification of objects (e.g., walls, floors, etc) in accordance with one embodiment.

FIG. 6 illustrates a network architecture for identification of objects (e.g., walls, floors, etc) in accordance with one embodiment. The network architecture 600 includes a hub 602 and a sensor node 610. The hub sends a TOF signal 640 for determining time of flight information for estimating a distance from the hub to the sensor. Signal strength information can be determined from standard communications sent between the hub and node. A signal strength region 650 indicates how the signal strength is attenuated significantly due to an object 620 (e.g., wall). If time of flight information suggests a significantly shorter distance (e.g., at least 10% shorter distance, at least 20% shorter distance, 10-30% shorter distance, 10-50% shorter distance, etc.) than signal strength information, then this indicates the presence of an attenuating element or object such as a wall in the signal path as illustrated in FIG. 6. Thus, the use of both signal strength and time of flight parameters can allow identification of objects such as walls, etc., providing improved localization.

Figure 7:
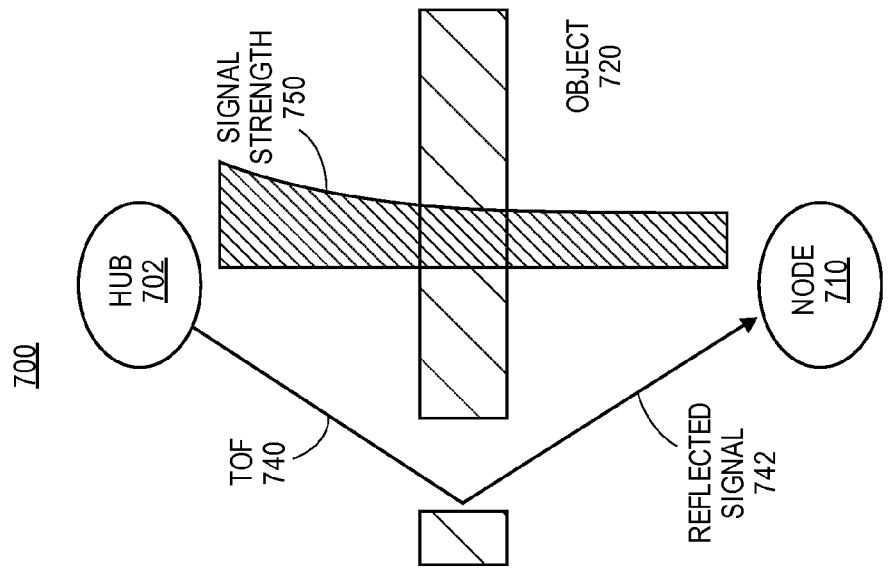
FIG. 7 illustrates a network architecture for identification of objects (e.g., walls, floors, etc) in accordance with one embodiment.

FIG. 7 illustrates a network architecture for identification of objects (e.g., walls, floors, etc) in accordance with one embodiment. The network architecture 700 includes a hub 702 and a sensor node 710. The hub sends a TOF signal 740 for determining time of flight information for estimating a distance from the hub to the sensor. Signal strength information can be determined or extracted from standard communications sent between the hub and node. A signal strength region 750 indicates how the signal strength is attenuated slightly due to an object 720 (e.g., wall). If the time of flight information indicates a significantly longer distance (e.g., at least 10% longer distance, at least 20% longer distance, etc.) between nodes (hub and node) than the signal strength estimated distance would indicate, then this may indicate the presence of a reflection (e.g., reflected signal 742) that masks the timing of the main TOF signal 740. As such, the use of both of these measurement techniques can significantly enhance the quality and precision of localization.

The combination of signal strength measurements and time of flight allows for power savings. In one embodiment of this invention, once localization and triangulation has been completed using at least one of time of flight and signal strength measurements, the hub constantly tracks the signal strength to each node and vice versa. Estimation of signal strength is quick and does not require as much data to be sent as time of flight estimation; as a consequence, using this technique, it is possible to reduce power consumption and only re-trigger location estimation when the hub detects a confirmed, robust, and non-transient signal strength change.

Figure 8:
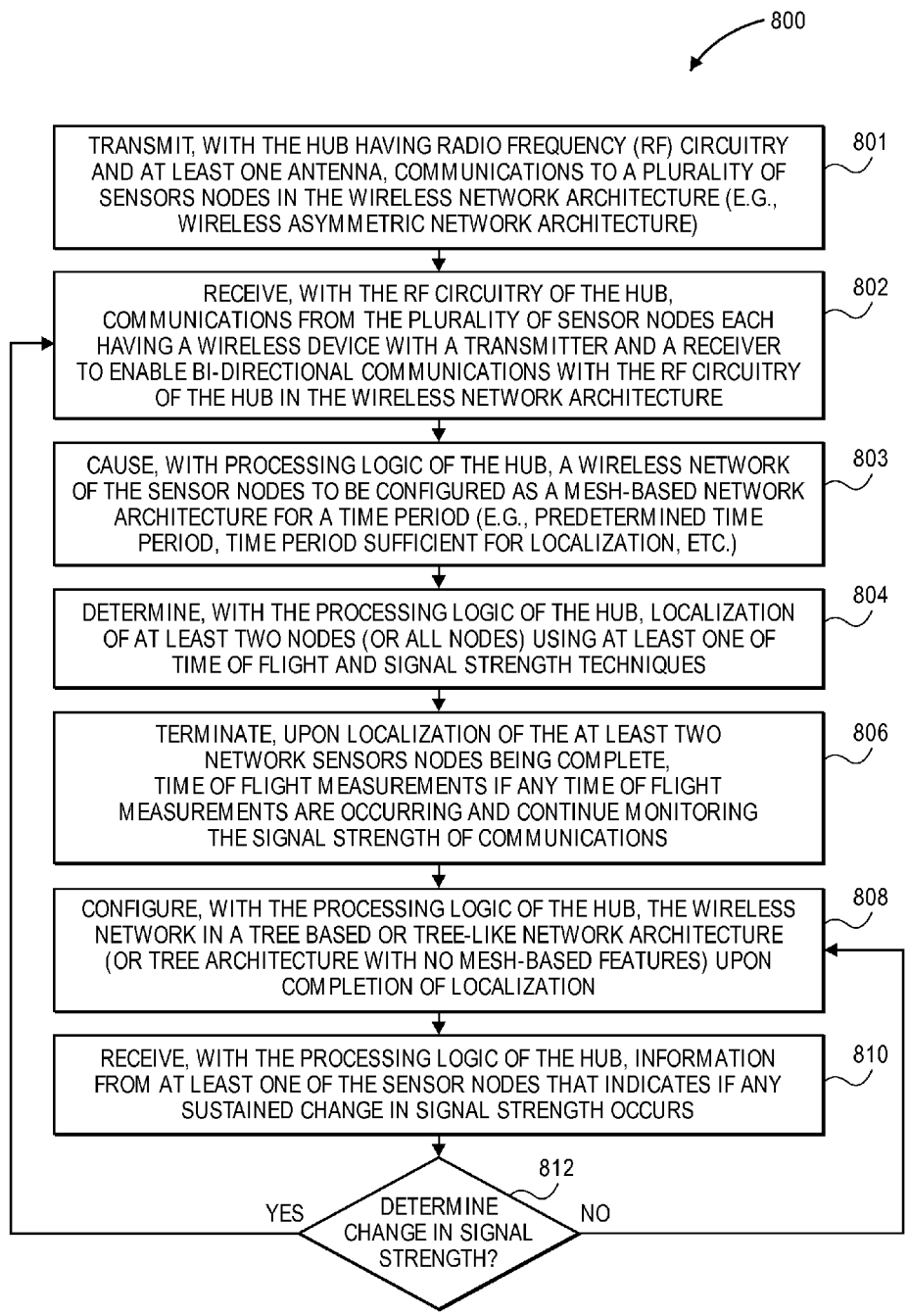
FIG. 8 illustrates a method for triggering location estimation of nodes upon detection of a change in signal strength in accordance with one embodiment.

FIG. 8 illustrates a method for triggering location estimation of nodes upon detection of a change in signal strength in accordance with one embodiment. The operations of method 800 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 800.

At operation 801, the hub having radio frequency (RF) circuitry and at least one antenna transmits communications to a plurality of sensor nodes in the wireless network architecture (e.g., wireless asymmetric network architecture). At operation 802, the RF circuitry and at least one antenna of the hub receives communications from the plurality of sensor nodes each having a wireless device with a transmitter and a receiver to enable bi-directional communications with the RF circuitry of the hub in the wireless network architecture. At operation 803, processing logic of a hub having a wireless control device initially causes a wireless network of sensor nodes to be configured as a mesh-based network architecture for a time period (e.g., predetermined time period, time period sufficient for localization, etc.). At operation 804, the processing logic of the hub determines localization of at least two nodes (or all nodes) using at least one of time of flight and signal strength techniques as discussed in the various embodiments disclosed herein. At operation 806, upon localization of the at least two network sensor nodes being complete, the processing logic of the hub terminates time of flight measurements if any time of flight measurements are occurring and continues monitoring the signal strength of communications with the at least two nodes. Similarly, the at least two nodes may monitor the signal strength of communications with the hub. At operation 808, the processing logic of the hub configures the wireless network in a tree based or tree-like network architecture (or tree architecture with no mesh-based features) upon completion of localization. At operation 810, the processing logic of the hub may receive information from at least one of the sensor nodes that indicates if any sustained change in signal strength occurs. Then, at operation 812, the processing logic of the hub determines (either on its own or based on information received from at least one of the sensor nodes) whether there has been a sustained change in signal strength to a particular node. If so, the method returns to operation 802 with the processing logic of the hub configuring the network as a mesh-based network architecture for a time period and re-triggering localization at operation 804 using at least one of time of flight and signal strength techniques (e.g., time of flight and signal strength techniques) disclosed herein. Otherwise, if no sustained change in signal strength for a particular node, then the method returns to operation 808 and the network continues to have a tree based or tree-like network architecture (or tree architecture with no mesh-based features).

Figure 10:
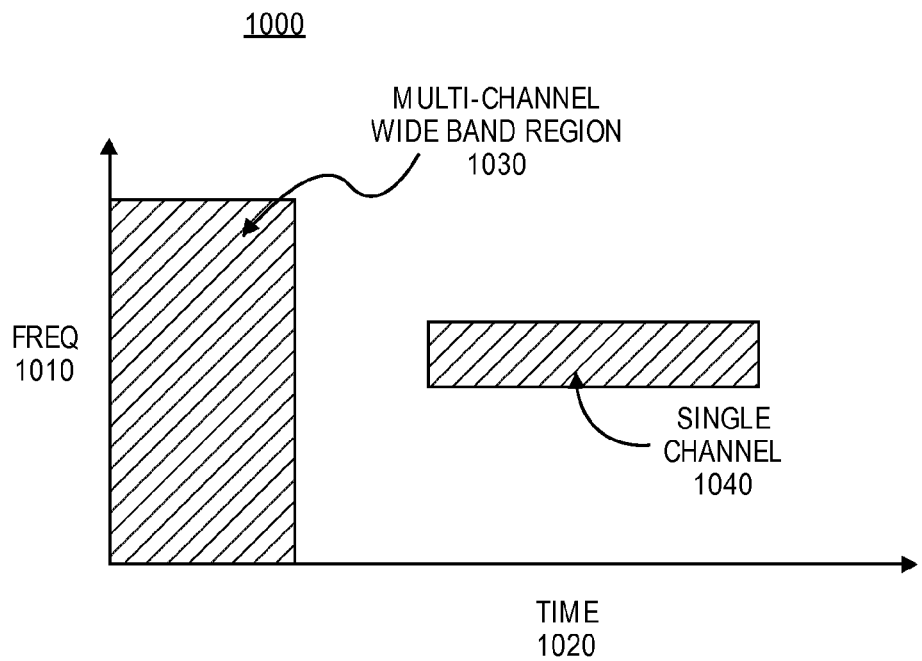
FIG. 10 illustrates a diagram 1000 for localization of nodes by using multiple channels simultaneously in accordance with one embodiment.
Figure 11:
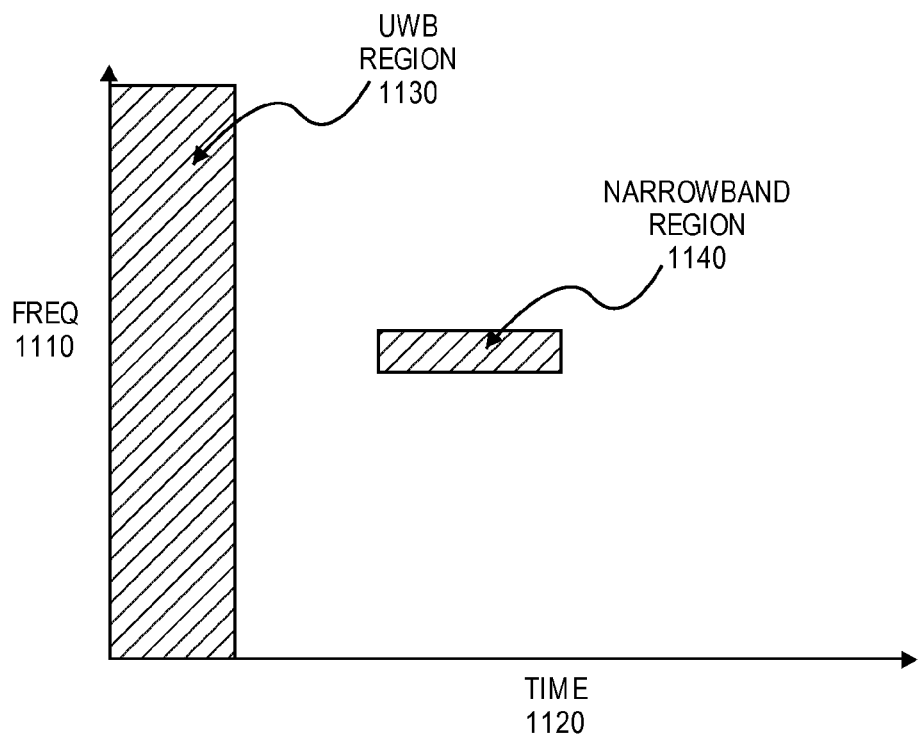
FIG. 11 illustrates a diagram 1100 for localization of nodes by using ultra-wide band temporarily in accordance with one embodiment.

One of the problems with wireless-based localization is that degradation or variations in channel quality can impact the accuracy and precision of localization. Many of these disruptions affect narrow-band transmissions. Therefore, in one embodiment of this invention, the aforementioned localization techniques are measured sequentially using multiple channels of a particular frequency band, thus effectively increasing the bandwidth of the measurement and allowing for improved accuracy and precision of measurement. In another embodiment of this invention, during localization, the techniques are implemented by temporarily using a wider bandwidth by taking over more than one channel of a particular frequency band. In yet another embodiment of this invention, localization is performed using ultra-wide band transmissions. These various embodiments are shown in FIG. 9-11.

Figure 9A:
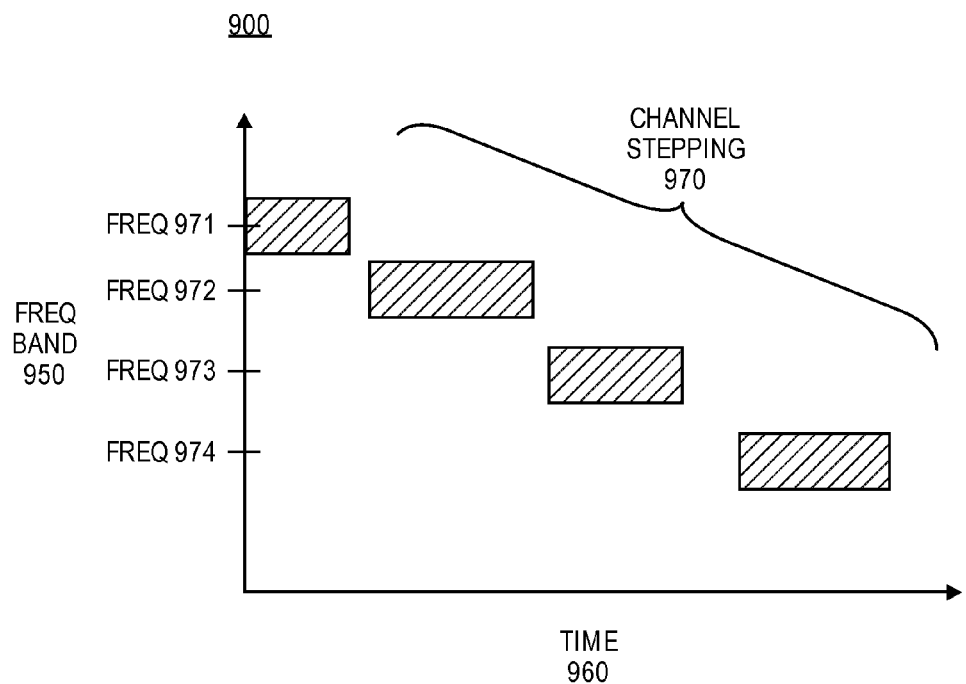
FIG. 9A illustrates a diagram 900 for localization of nodes using channel stepping in accordance with one embodiment.

FIG. 9A illustrates a diagram 900 for localization of nodes using channel stepping in accordance with one embodiment. The diagram 900 illustrates a frequency band 950 having frequency channels 971-974 on a vertical axis versus time on a horizontal axis. Localization techniques (e.g., time of flight, signal strength) as discussed herein are performed by stepping through the various channels (e.g., 971-973) within an available frequency band 950. The advantage of this approach is that a narrow-band radio (e.g., hub radio of RF circuitry, sensor node radio of RF circuitry) can be used to effectively achieve wide-band localization. To make use of this approach, it is necessary to maintain a controlled time-base over the full time period of this measurement.

Figure 9B:
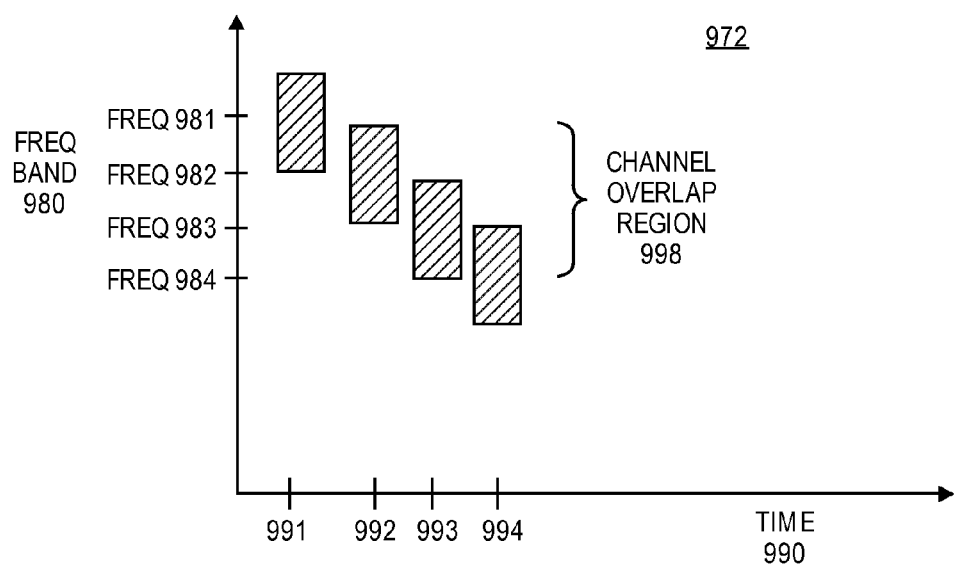
FIG. 9B illustrates a diagram 972 for localization of nodes using channel overlapping in accordance with another embodiment.
Figure 9C:
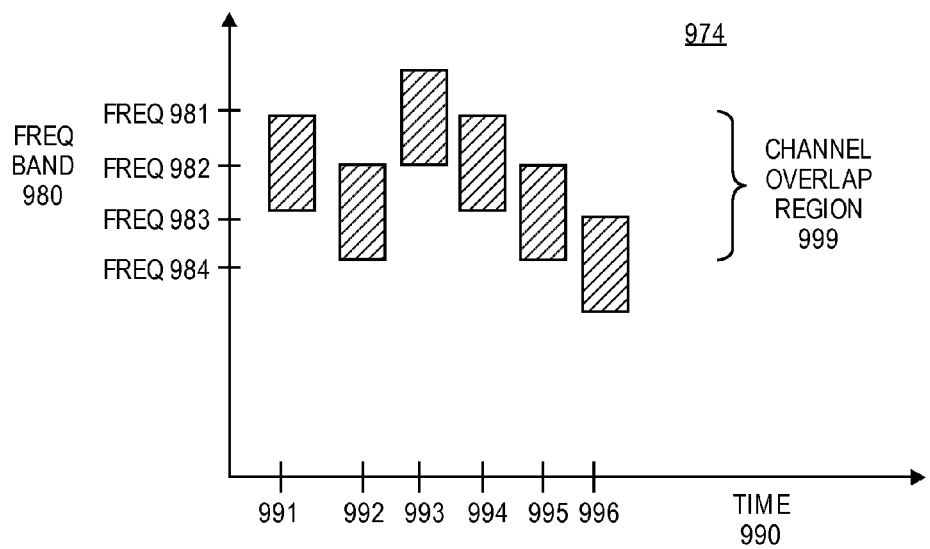
FIG. 9C illustrates a diagram 974 for localization of nodes using non-sequential channel selection in accordance with another embodiment.

FIG. 9B illustrates a diagram 972 for localization of nodes using channel overlapping in accordance with another embodiment. The diagram 972 illustrates a frequency band 980 having frequency channels 981-984 on a vertical axis versus time with time slots 991-994 on a horizontal axis. Localization techniques (e.g., time of flight, signal strength) as discussed herein are performed by stepping through the various channels (e.g., 981-984) within an available frequency band 980. The advantage of this approach is that a narrow-band radio (e.g., hub radio of RF circuitry, sensor node radio of RF circuitry) can be used to effectively achieve wide-band localization. In this system, the channels used for any given estimation are overlapped in frequency in channel overlap region 998. By overlapping the channels, requirements on time synchronization over the entire measurement procedure can be relaxed, since phase relationships can be established in each overlapped region. This offers, for example, the benefit of allowing non-sequential channel selection as illustrated in a diagram 974 of FIG. 9C in accordance with another embodiment. The diagram 974 illustrates a frequency band 980 having frequency channels 981-984 on a vertical axis versus time with time slots 991-996 on a horizontal axis. For an example of non-sequential channel selection, the overlap of frequency channels 982 and 983 can be determined first, followed by the overlap of the frequency channels 981 and 982, and then followed by the overlap of the frequency channels 983 and 984. The channels are overlapped in channel overlap region 999. In alternative embodiments, TOF measurements can be spaced out over time as well.

In one example, a time domain correlation is performed for TOF calculations. In another example, a frequency domain calculation is performed to extract flight delays from a frequency domain. A receiving node may determine a frequency domain representation of a channel, which will include amplitudes and phases, based on determining a fast fourier transform (FFT) for a received signal and then dividing this by a FFT of ideal pilot tones across a range frequencies. Alternative methods of channel estimation may also be used, such as least squares estimation, maximum likelihood estimation, and other such techniques as would be apparent to one of skill in the art. Vectors of different flight paths can then be determined from the frequency domain representation of the channel. In one example, a matrix pencil method is used for determining the vectors of different flight paths. In still another embodiment, an inverse FFT may be used to determine path lengths from the channel estimate. A flight path having a shortest delay is likely a line of sight flight path while longer delays likely correspond to reflected flight paths. Multiple frequency channels can be overlapped to create a wider bandwidth channel that produces a more accurate TOF estimate.

Figure 9D:
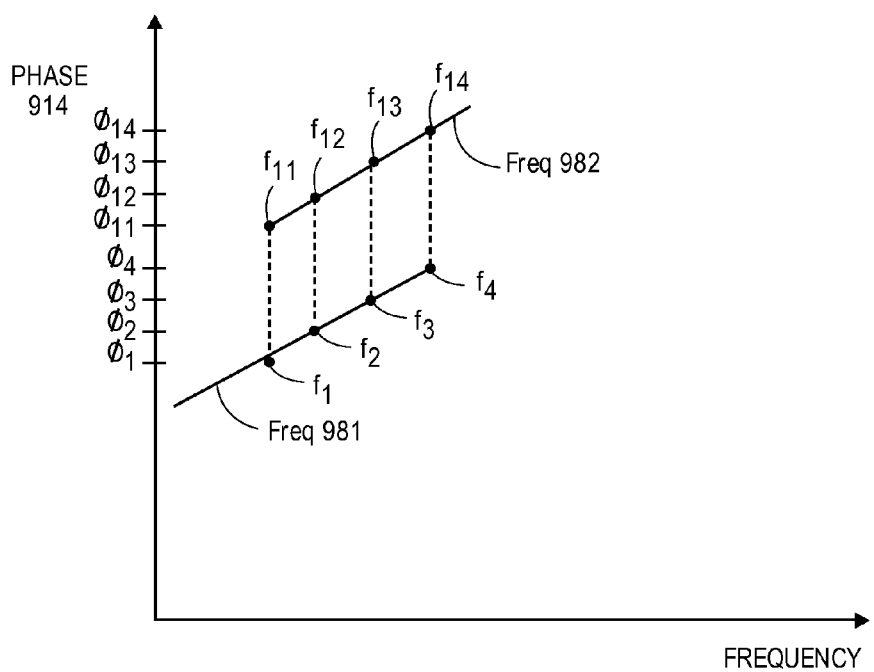
FIG. 9D illustrates a diagram 910 for determining a phase for channel overlapping in accordance with another embodiment.

FIG. 9D illustrates a diagram 910 for determining a phase for channel overlapping in accordance with another embodiment. The diagram 910 illustrates a frequency 912 on a horizontal axis and phase 914 a vertical axis. In one example, a frequency channel 981 has a band of frequencies (e.g., f1, f2, f3, f4) and corresponding phases (e.g., phase 1, phase 2, phase 3, phase 4). Frequency channel 981 also extends to lower frequencies and phases below f1 and phase 1. A frequency channel 982 has a band of frequencies (e.g., f11, f12, f13, f14) and corresponding phases (e.g., phase 11, phase 12, phase 13, phase 14). Frequency channel 982 also extends to higher frequencies and phases above f14 and phase 14. There is thus an overlapping region of frequencies between f1 to f4 and f11 to f14. A phase (e.g., average phase) for an overlapping region of frequencies 981 and 982 can be determined by calculating a difference or delta of the different phases at a certain frequencies within the overlapping region. For example, a first delta phase can be calculated based on a difference between phase 11 and phase 1. A second delta phase can be calculated based on a difference between phase 12 and phase 2. A third delta phase can be calculated based on a difference between phase 13 and phase 3. A fourth delta phase can be calculated based on a difference between phase 14 and phase 4. The frequencies f1, f2, f3, and f4 are approximately the same (or the same) as the frequencies f11, f12, f13, and f14, respectively. A delta phase (e.g., an average delta phase) can then be calculated based on calculating an average of the first, second, third, and fourth delta phases. The average delta phase is then used for shifting a phase of the frequency channel 982. Phase shifts for additional overlapping channels (e.g., channels 981-984) can then occur in a similar manner as discussed for channels 981 and 982.

FIG. 10 illustrates a diagram 1000 for localization of nodes by using multiple channels simultaneously in accordance with one embodiment. The diagram 1000 illustrates a multi-channel wide frequency band region 1030 having multiple channels on a vertical axis of frequency 1010 versus time 1020 on a horizontal axis. Localization techniques (e.g., time of flight, signal strength) as discussed herein are performed by temporarily taking over multiple channels of a particular frequency band for the purpose of localization. This allows for the benefits of wide-band localization without requiring scanning of multiple channels over an extended period of time. This localization can occur while a wireless network is configured as a mesh-based network architecture. Once localization is complete, the radios of RF circuitry of at least one hub and multiple nodes can switch back to use individual frequency channels (e.g., single channel 1040) for the purpose of standard communication while the wireless network is configured as a tree-like or tree-based network architecture.

FIG. 11 illustrates a diagram 1100 for localization of nodes by using ultra-wide band temporarily in accordance with one embodiment. The diagram 1100 illustrates an ultra-wide band region 1130 on a vertical axis of frequency 1110 versus time 1120 on a horizontal axis. Localization techniques (e.g., time of flight, signal strength) as discussed herein are performed by temporarily using an ultra-wide band radio of RF circuitry of at least one hub and nodes in a wireless network for the purpose of localization. This allows for the benefits of ultra-wide band localization without requiring scanning of multiple channels over an extended period of time. This localization can occur while a wireless network is configured as a mesh-based network architecture. Once localization is complete, the radios of RF circuitry of at least one hub and multiple nodes can switch back to use a narrow-band region 1140 (e.g., narrow-band radios) for the purpose of standard communication while the wireless network is configured as a tree-like or tree-based network architecture. In one example, signal strength measurements on the narrow-band radio(s) may be used to decide when to trigger localization using the ultra-wide band radio(s).

Figure 12:
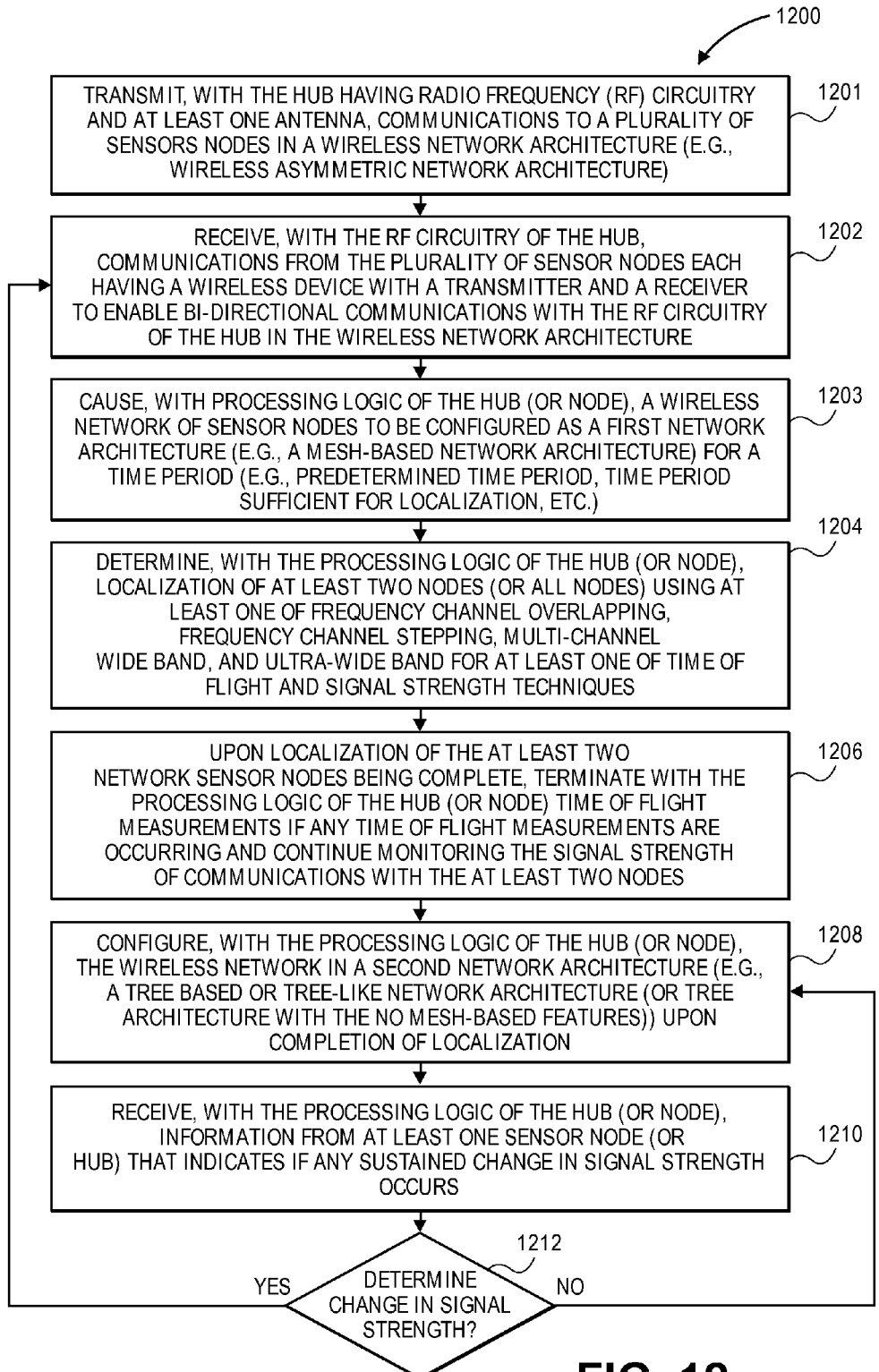
FIG. 12 illustrates a method for location estimation of nodes upon detection of a change in signal strength in accordance with one embodiment.

FIG. 12 illustrates a method for location estimation of nodes upon detection of a change in signal strength in accordance with one embodiment. The operations of method 1200 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1200.

At operation 1201, the hub having radio frequency (RF) circuitry and at least one antenna transmits communications to a plurality of sensor nodes in the wireless network architecture (e.g., wireless asymmetric network architecture). At operation 1202, the RF circuitry and at least one antenna of the hub receives communications from the plurality of sensor nodes each having a wireless device with a transmitter and a receiver to enable bi-directional communications with the RF circuitry of the hub in the wireless network architecture. At operation 1203, processing logic of the hub (or node) having a wireless control device initially causes a wireless network of sensor nodes to be configured as a first network architecture (e.g., a mesh-based network architecture) for a time period (e.g., predetermined time period, time period sufficient for localization, etc.). At operation 1204, the processing logic of the hub (or node) determines localization of at least two nodes (or all nodes) using at least one of frequency channel overlapping, frequency channel stepping, multi-channel wide band, and ultra-wide band for at least one of time of flight and signal strength techniques as discussed in the various embodiments disclosed herein. At operation 1206, upon localization of the at least two network sensor nodes being complete, the processing logic of the hub (or node) terminates time of flight measurements if any time of flight measurements are occurring and continues monitoring the signal strength of communications with the at least two nodes. Similarly, the at least two nodes may monitor the signal strength of communications with the hub. At operation 1208, the processing logic of the hub (or node) configures the wireless network in a second network architecture (e.g., a tree based or tree-like network architecture (or tree architecture with no mesh-based features)) upon completion of localization. At operation 1210, the processing logic of the hub (or node) may receive information from at least one of the sensor nodes (or hub) that indicates if any sustained change in signal strength occurs. Then, at operation 1212, the processing logic of the hub (or node) determines (either on its own or based on information received from at least one of the sensor nodes) whether there has been a sustained change in signal strength to a particular node. If so, the method returns to operation 1202 with the processing logic of the hub configuring the network as the first network architecture for a time period and re-triggering localization at operation 1204 using at least one of frequency channel overlapping, frequency channel stepping, multi-channel wide band, and ultra-wide band for at least one of time of flight and signal strength techniques (e.g., time of flight and signal strength techniques) disclosed herein. Otherwise, if no sustained change in signal strength for a particular node, then the method returns to operation 1208 and the network continues to have second network architecture.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including narrow-band, channel overlapping, channel stepping, multi-channel wide band, and ultra-wide band communications.

In embodiments where the network is asymmetric, such that the hub is bigger or has more available power than the nodes, it may be advantageous to use multiple antennas on the hub to estimate angle of arrival of the communication with the nodes. This may be used in conjunction with the other localization techniques disclosed herein to improve localization accuracy and/or identify the existing of reflected paths of transmission. Similarly, multiple antennas may also be used in some or all of the nodes to achieve similar benefits with respect to node-to-node or hub-to-node transmission reception for the purpose of localization.

Figure 13:
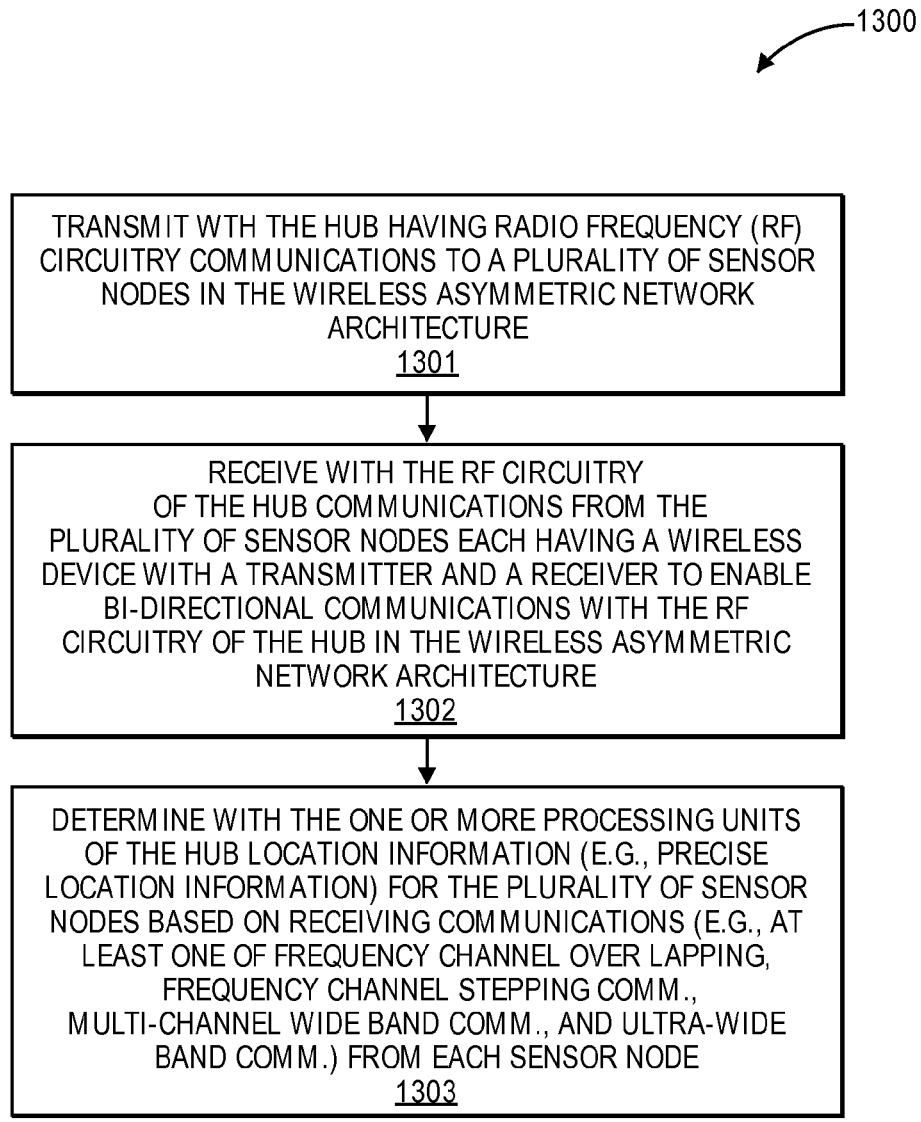
FIG. 13 illustrates a flow chart for a method of providing implementation of sensor localization for a wireless asymmetric network architecture in accordance with one embodiment.

FIG. 13 illustrates a flow chart for a method of providing implementation of sensor localization for a wireless asymmetric network architecture in accordance with one embodiment. The operations of method 1300 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1300.

At operation 1301, the hub having radio frequency (RF) circuitry and at least one antenna transmits communications to a plurality of sensor nodes in the wireless asymmetric network architecture. At operation 1302, the RF circuitry and at least one antenna of the hub receives communications from the plurality of sensor nodes each having a wireless device with a transmitter and a receiver to enable bi-directional communications with the RF circuitry of the hub in the wireless asymmetric network architecture. At operation 1303, the processing logic (e.g., one or more processing units) of the hub determine location information (e.g., precise location information) for the plurality of sensor nodes based on receiving communications (e.g., at least one of frequency channel overlapping communications, frequency channel stepping communications, multi-channel wide band communications, and ultra-wide band communications for at least one of time of flight and signal strength techniques from each sensor node). The level of precision required may be chosen based on the needs of the application for which the sensor network is deployed. For example, location precision may be better than 1 meter (m) in any direction, such that in a typical indoor or near-indoor environment, the approximate position of the sensors are known, and there is little or no overlap in the certainly of position of any two or more sensors. In applications requiring greater precision, location precision of better than 10 centimeters (cm) can be obtained, such that the accurate position of each sensor node is known.

In one example, the hub is powered by a mains electrical source and the plurality of sensor nodes are each powered by a battery source or another energy source (not mains electrical source) to form the wireless asymmetric network architecture.

In one example, the one or more processing units of the hub determine location information for the plurality of sensor nodes based on at least one of angle of arrival information, signal strength information, and time of arrival information for the communications received from the plurality of sensor nodes.

In another example, the one or more processing units determine location information for the plurality of sensor nodes based on angle of arrival information for determining an angle of arrival with a strongest signaling component and combined with information to identify a shortest direct path in a multi-path environment, which is determined from time of arrival information, for the communications from the plurality of sensor nodes.

In one example, the wireless asymmetric network architecture includes at least one of a wireless tree asymmetric network architecture or a wireless tree and mesh asymmetric network architecture.

In one embodiment, the at least one antenna of the hub transmits at least one of frequency channel overlapping, channel stepping, multi-channel wide band, or ultra-wide band (UWB) communications to the plurality of sensor nodes and receives at least one of channel overlapping, channel stepping, multi-channel wide band, or ultra-wide band (UWB) communications from the plurality of sensor nodes for localization while the network has a mesh-based architecture. Upon detection of a change in signal strength of at least one of the nodes, the network is configured as a tree-based or tree-like network architecture with narrow-band communications for standard communications with no localization.

Hubs receiving transmissions from nodes, for example, can determine the location of nodes using angle of arrival (AOA), signal strength (SS) and/or Time of Arrival (TOA) information. AOA information can be determined using multiple antennas on the hub to enable determination of the angle of arrival with the strongest signal component. Combined with information to identify the most direct path, which can be determined from TOA, sensor location can be established. SS information can be used to estimate sensor distance from nodes, and, combined with AOA, can provide sensor localization. In one example, the overall architecture for sensor localization is shown in FIG. 14.

Figure 14:
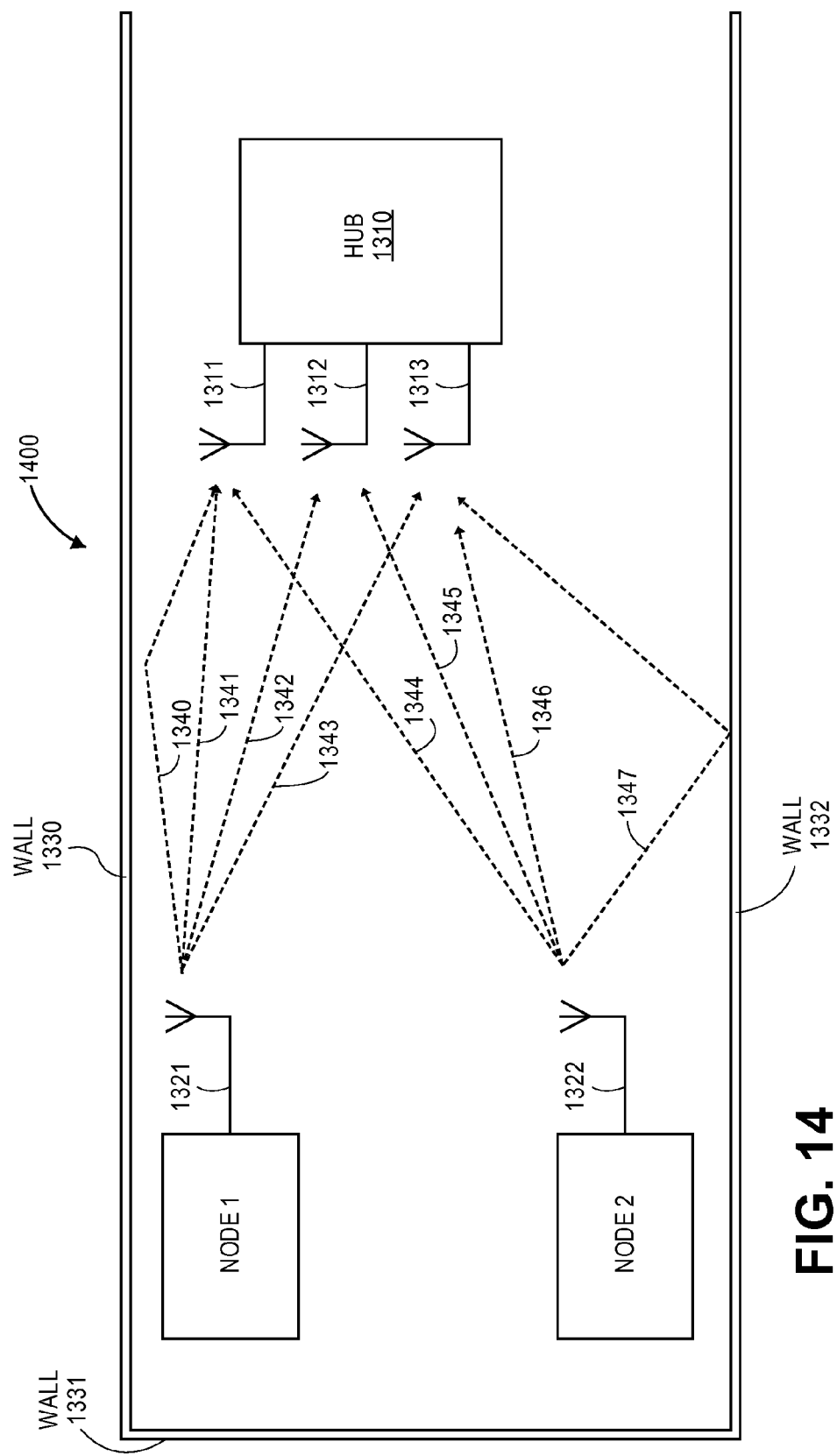
FIG. 14 illustrates use of multiple antennas on an apparatus (e.g., hub) and a multipath environment to enable sensor localization in accordance with one embodiment.

FIG. 14 illustrates use of multiple antennas on an apparatus (e.g., hub) and a multipath environment to enable sensor localization in accordance with one embodiment. The environment 1400 includes walls 1330, 1331, and 1332. A hub 1310 includes antennas 1311, 1312, and 1313. The sensor node 1 includes an antenna 1321 and the sensor node 2 includes an antenna 1322. The hub 1310 if receiving transmissions 1340-1347 (e.g., at least one of frequency channel overlapping communications, frequency channel stepping communications, multi-channel wide band communications, and ultra-wide band communications) from nodes 1 and 2, for example, can determine the location of nodes 1 and 2 using angle of arrival (AOA), signal strength (SS) and/or Time of Arrival (TOA) information. The effect of multiple paths (e.g., based on reflections from walls or other objects such as a first path for transmission 1346 and a second path for transmission 1347 that is reflected by wall 1332) can be accommodated based on locating walls, objects, or reflections as described in conjunction with FIGS. 6 and 7. AOA information can be determined using multiple antennas 1311-1313 on the hub 1310 to enable determination of the angle of arrival with the strongest signal component. Combined with information to identify the most direct path, which can be determined from TOA, sensor location of nodes 1 and 2 can be established. Similarly, SS information can be used to estimate sensor distance from nodes, and, combined with AOA, can provide sensor localization.

In an alternative embodiment, multiple hubs can be used to simultaneously receive data from sensor nodes. In this application, by triangulating from distances measured via SS or TOA estimates, location of sensors can be established without need for AOA determination.

Figure 15:
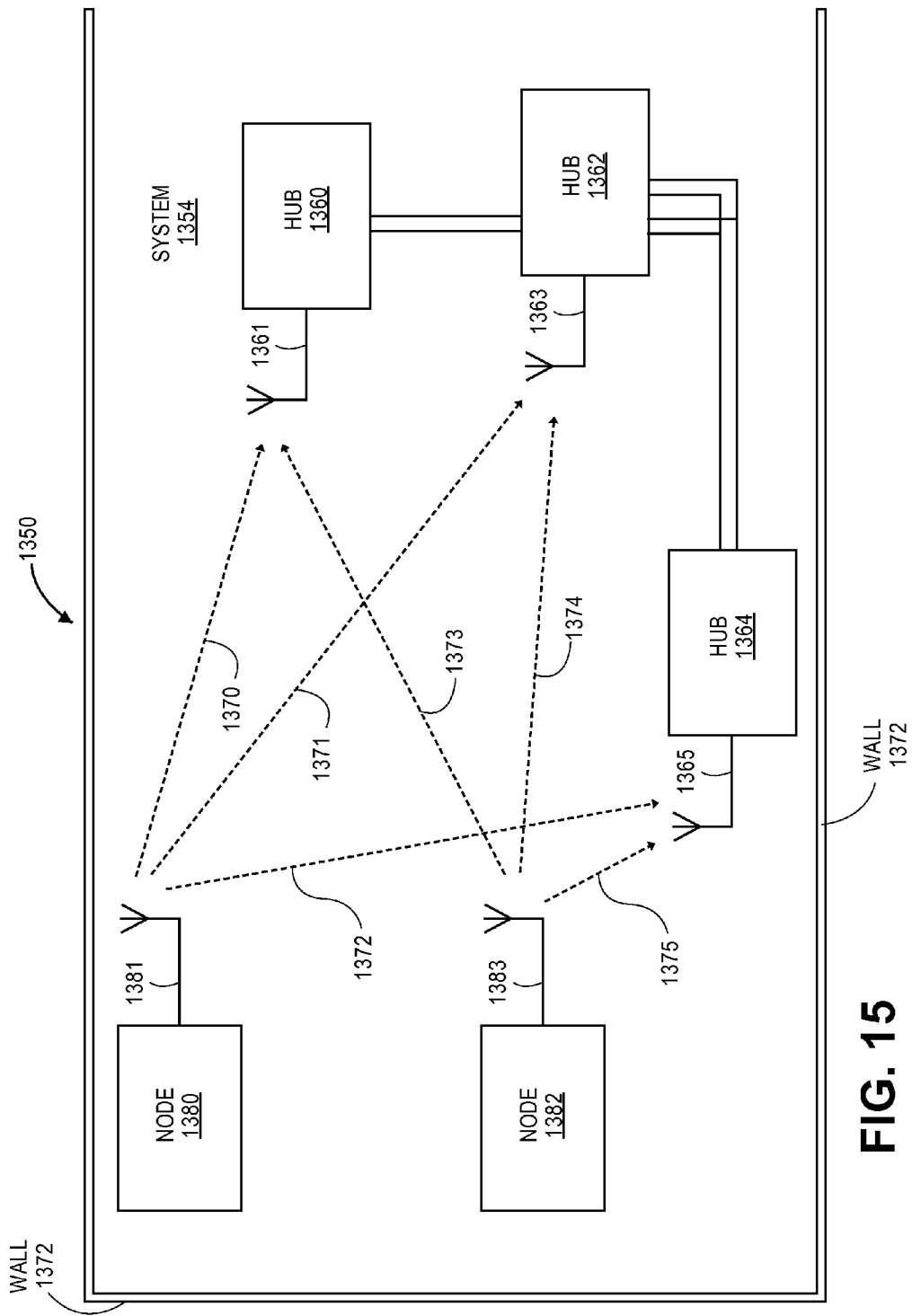
FIG. 15 illustrates use of multiple hubs each having a single antenna to achieve localization in accordance with one embodiment.

FIG. 15 illustrates use of multiple hubs each having a single antenna to achieve localization of sensors in accordance with one embodiment. The environment 1350 includes walls 1370, 1371, and 1372. A system 1354 includes a hub 1360 having an antenna 1361, a hub 1362 having an antenna 1363, and a hub 1364 having an antenna 1365. In one example, the hubs are synchronized with each other. The sensor node 1382 includes an antenna 1383 and the sensor node 1380 includes an antenna 1381. The sensor node 1380 transmits transmissions 1370-1372 (e.g., at least one of frequency channel overlapping communications, frequency channel stepping communications, multi-channel wide band communications, and ultra-wide band communications) to the hubs 1360, 1362, and 1364, respectively as illustrated in FIG. 15. The sensor node 1382 transmits transmissions 1373-1375 (e.g., at least one of frequency channel overlapping communications, frequency channel stepping communications, multi-channel wide band communications, and ultra-wide band communications) to the hubs 1360, 1362, and 1364, respectively as illustrated in FIG. 15. Time of arrival information at multiple hubs can be used to map location of the nodes 1380 and 1382.

Figures 16A, 16B:
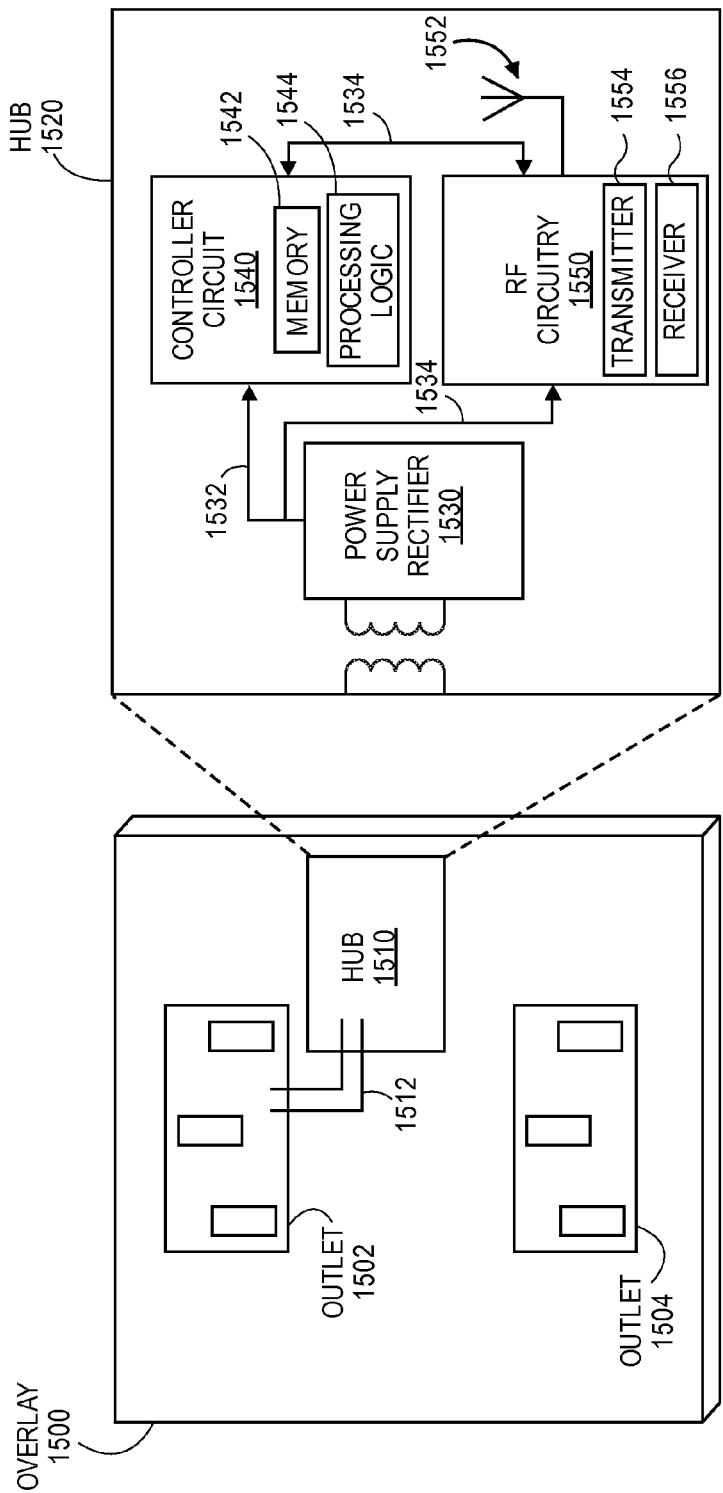
FIG. 16A shows an exemplary embodiment of a hub implemented as an overlay 1500 for an electrical power outlet in accordance with one embodiment.
FIG. 16B shows an exemplary embodiment of an exploded view of a block diagram of a hub 820 implemented as an overlay for an electrical power outlet in accordance with one embodiment.

The hubs may be physically implemented in numerous ways in accordance with embodiments of the invention. FIG. 16A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 16B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 17B:
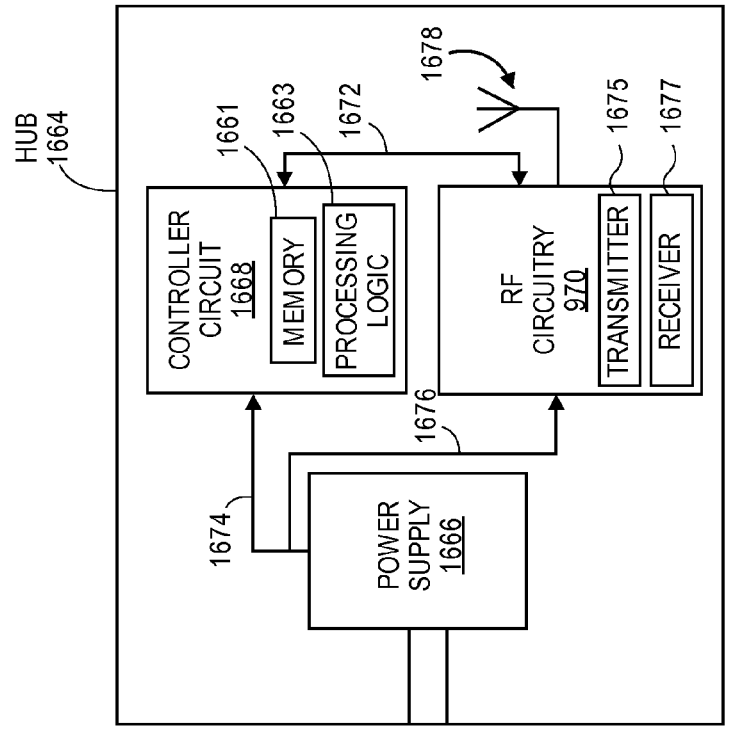
FIG. 17B shows an exemplary embodiment of a block diagram of a hub 964 implemented as a card for deployment in a computer system, appliance, or communication hub in accordance with one embodiment.
Figure 17A:
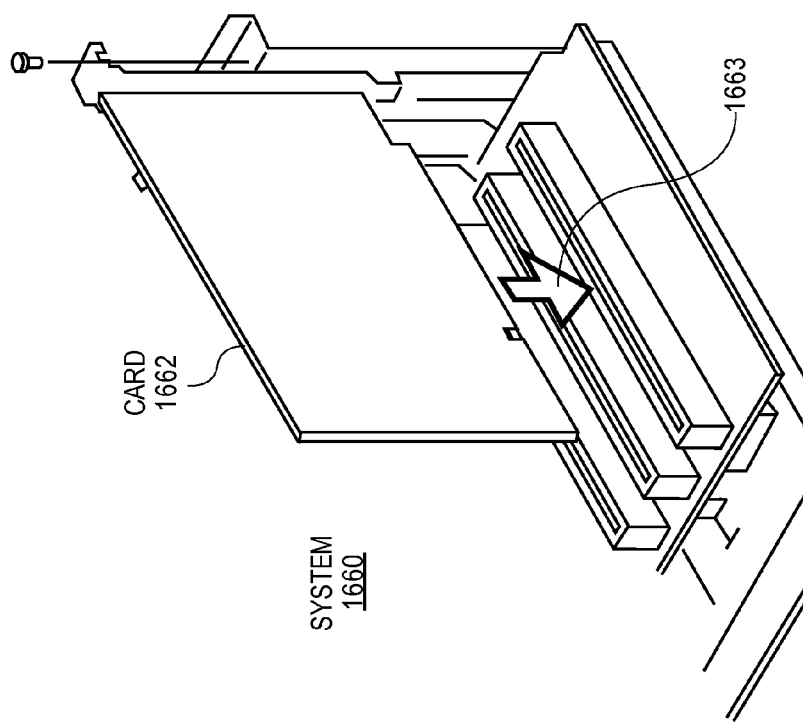
FIG. 17A shows an exemplary embodiment of a hub implemented as a card for deployment in a computer system, appliance, or communication hub in accordance with one embodiment.

FIG. 17A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 17B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

Figure 17D:
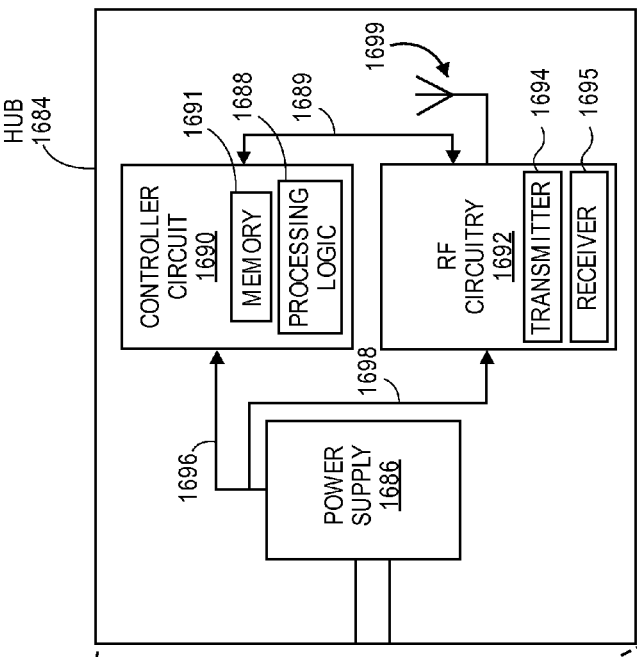
FIG. 17D shows an exemplary embodiment of an exploded view of a block diagram of a hub 1684 implemented within an appliance (e.g., smart washing machine, smart refrigerator, smart thermostat, other smart appliances, etc.) in accordance with one embodiment.
Figure 17C:
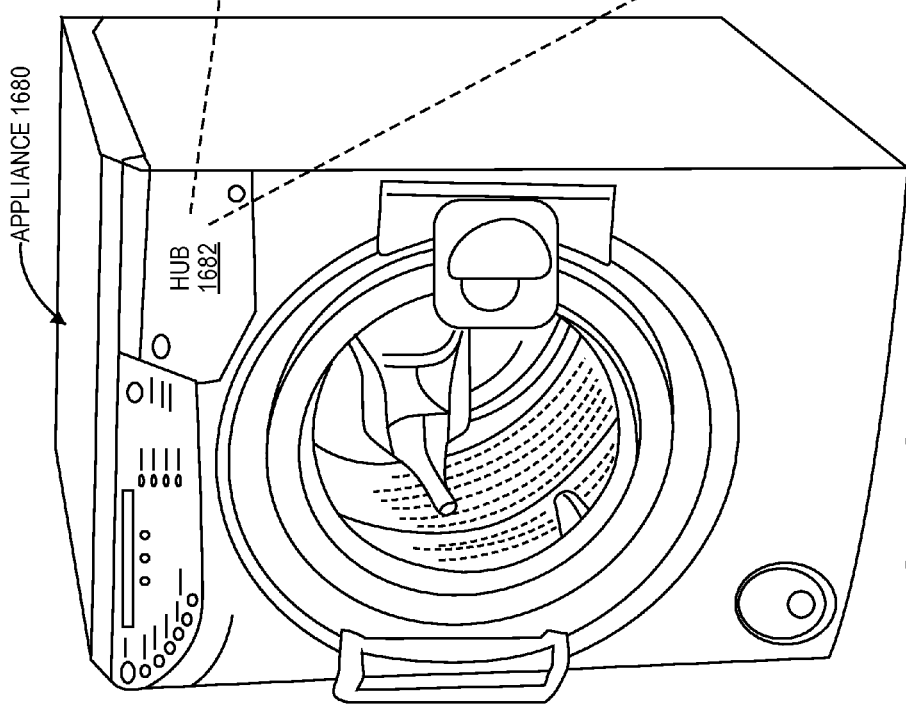
FIG. 17C shows an exemplary embodiment of a hub implemented within an appliance (e.g., smart washing machine, smart refrigerator, smart thermostat, other smart appliances, etc.) in accordance with one embodiment.

FIG. 17C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 17D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture. The processing logic (e.g., one or more processing units) are configured to execute instructions to configure the wireless network architecture with a tree architecture for communications between the apparatus and the plurality of sensor nodes, to detect a change in range or position of at least one of the plurality of sensor nodes, to configure the wireless network architecture temporarily with a mesh-based architecture for determining location information for the plurality of sensor nodes based on detecting a change in range or position.

In one example, the apparatus is powered by a mains electrical source and the plurality of sensor nodes are each powered by a battery source to form the wireless network architecture.

In one example, the one or more processing units of the apparatus execute instructions to configure the wireless network architecture with the tree architecture for communications between the apparatus and the plurality of sensor nodes subsequent to determining location information while the wireless network architecture is configured with the temporary mesh-based architecture.

In another example, the one or more processing units execute instructions to determine location information for the plurality of sensor nodes based on triangulating from distances measured via time of flight information that is associated with communications occurring during the temporary mesh-based architecture.

In another example, the one or more processing units execute instructions to determine location information for the plurality of sensor nodes based on triangulating from distances measured via strength of signal information that is associated with communications.

In another example, the wireless network architecture is configured temporarily with a mesh-based architecture for a time period that is sufficient for localization.

In another example, the one or more processing units of the hub execute instructions to determine absolute location information for the sensor nodes based on the location information for the plurality of sensor nodes and an absolute location of the apparatus or at least one of the sensor nodes.

In one embodiment, a computer-implemented method for localization of nodes in a wireless network includes causing, with processing logic of a hub, the wireless network having nodes to be configured as a mesh-based network architecture for a time period. The computer-implemented method further includes determining, with the processing logic of the hub, localization of at least two nodes using at least one of time of flight and signal strength techniques. Upon localization of the at least two nodes being complete, terminating, with the processing logic of the hub, time of flight measurements if any time of flight measurements are occurring. The computer-implemented method further includes causing, with the processing logic of the hub, the wireless network to be configured in a tree based or tree-like network architecture upon completion of localization.

In one example, the computer-implemented method further includes receiving, with the processing logic of the hub, information from at least one of the nodes with the information used to determine if any sustained change in signal strength occurs. The computer-implemented method further includes determining, with the processing logic of the hub, whether there has been a sustained change in signal strength of at least one node of the wireless network.

In one example, the computer-implemented method further includes causing, with the processing logic of the hub, the wireless network to be configured as a mesh-based network architecture for a time period when there has been a sustained change in signal strength of at least one node of the wireless network.

The computer-implemented method further includes retriggering localization using at least one of time of flight and signal strength techniques upon the wireless network being configured as a mesh-based network architecture.

In another example, the wireless network continues to be configured as a tree based or tree-like network architecture if no sustained change in signal strength occurs for the least two nodes of the wireless network.

In one embodiment, a system includes a hub having one or more processing units and RF circuitry for transmitting and receiving communications in the wireless asymmetric network. A plurality of sensor nodes each having a wireless device with a transmitter and a receiver to enable bi-directional communications with the hub in the wireless asymmetric network architecture. The one or more processing units of the hub execute instructions to configure the system with a tree architecture for communications between the hub and the plurality of sensor nodes, to detect a change in range or position of at least one sensor node, and to configure the system temporarily with a mesh-based architecture for determining location information for the plurality of sensor nodes based on detecting a change in range or position.

In one example, the hub is powered by a mains electrical source and the plurality of sensor nodes are each powered by a battery source to form the wireless asymmetric network.

In one example, the one or more processing units of the hub execute instructions to configure the system with the tree architecture for communications at a first frequency level (e.g., lower frequency level and lower energy) between the hub and the plurality of sensor nodes subsequent to determining location information while the system is configured with the temporary mesh-based architecture for communications at a second frequency level (e.g., higher frequency level and higher energy).

In another example, the one or more processing units execute instructions to determine location information for the plurality of sensor nodes based on triangulating from distances measured via time of flight information that is associated with communications occurring during the temporary mesh-based architecture.

In another example, the one or more processing units to execute instructions to determine location information for the plurality of sensor nodes based on triangulating from distances measured via strength of signal information that is associated with communications.

In one example, the system is configured temporarily with a mesh-based architecture for a time period that is sufficient for localization of the sensor nodes.

In another example, the one or more processing units of the hub execute instructions to determine absolute location information for the sensor nodes based on the location information for the plurality of sensor nodes and an absolute location of the hub or at least one of the sensor nodes.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 18:
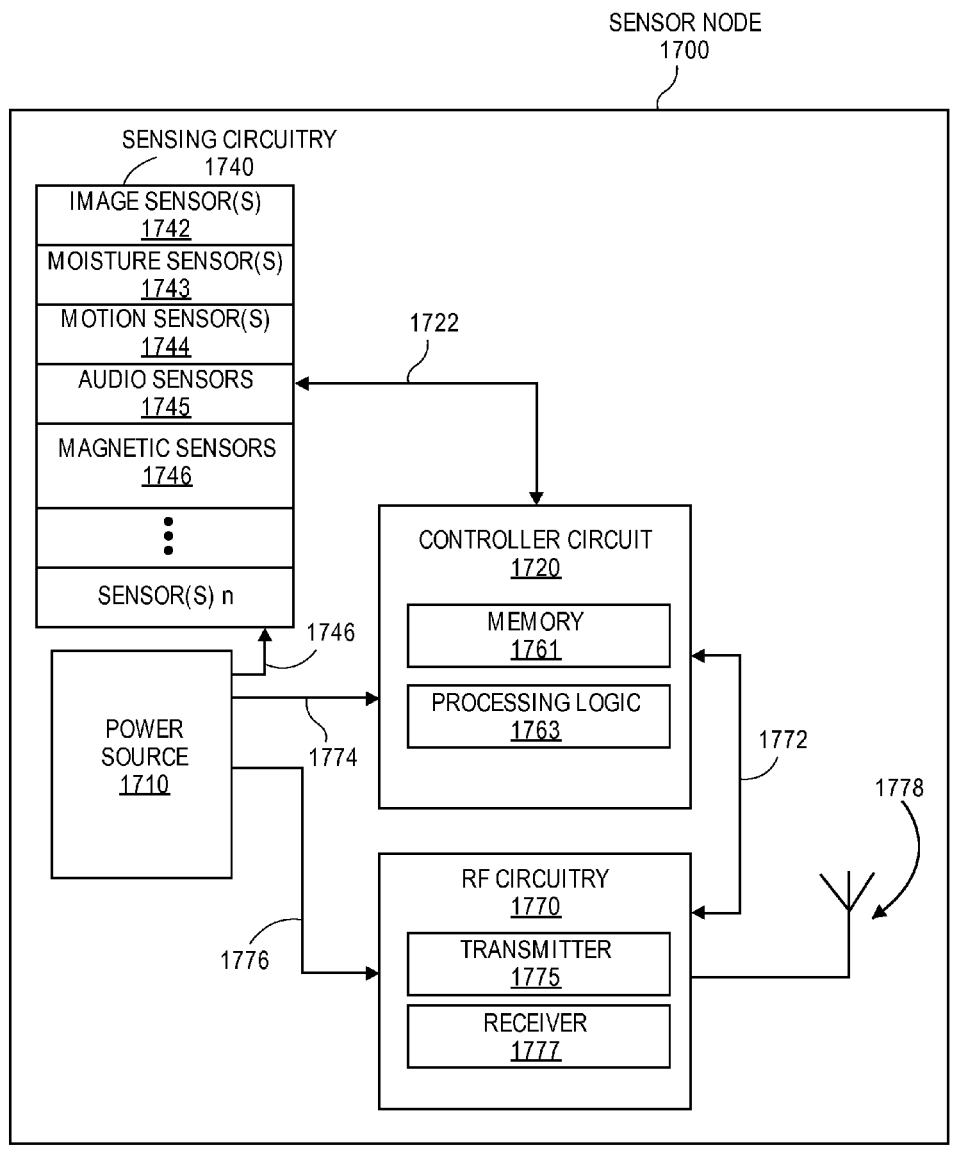
FIG. 18 illustrates a block diagram of a sensor node in accordance with one embodiment.

FIG. 18 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.).

The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 19:
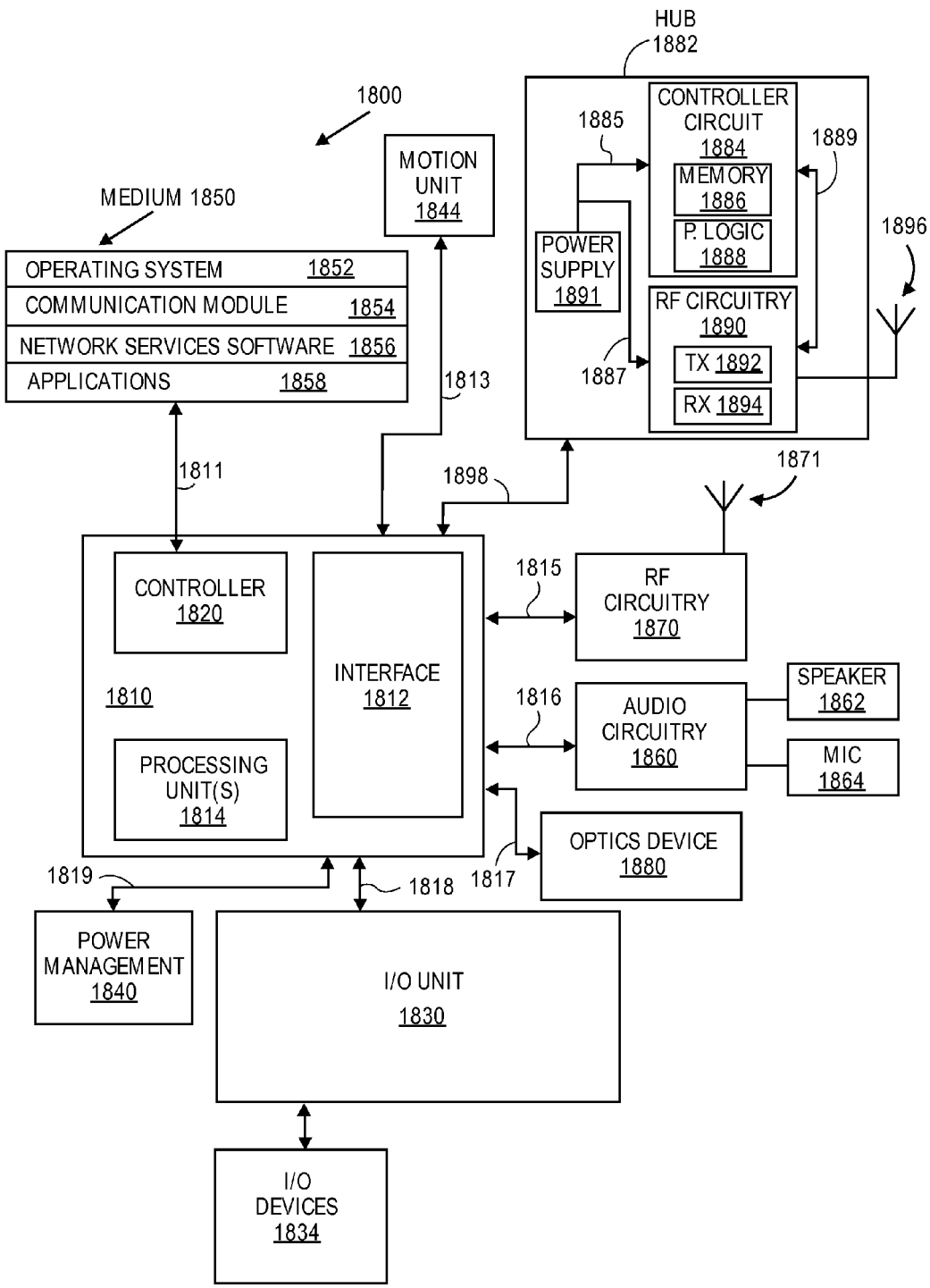
FIG. 19 illustrates a block diagram of a system or appliance 1800 having a hub in accordance with one embodiment.

FIG. 19 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In one embodiment, a computer-implemented method for localization of nodes in a wireless network includes causing, with processing logic of a hub, the wireless network having nodes to be configured as a first network architecture for a first time period for localization. The computer-implemented method further includes determining, with the processing logic of the hub, localization of at least two nodes using at least one of frequency channel overlapping communications, frequency channel stepping communication, multi-channel wide band communications, and ultra-wide band communications for at least one of time of flight and signal strength techniques and causing, with the processing logic of the hub, the wireless network to be configured in a second network architecture having narrow-band communications upon completion of localization.

In one example, the computer-implemented method further includes receiving, with the processing logic of the hub, information from at least one of the nodes with the information used to determine if any sustained change in signal strength occurs.

In one example, the computer-implemented method further includes determining, with the processing logic of the hub, whether there has been a sustained change in signal strength of at least one node of the wireless network.

In one example, the computer-implemented method further includes causing, with the processing logic of the hub, the wireless network to be configured as the first network architecture for a second time period when there has been a sustained change in signal strength of at least one node of the wireless network.

In one example, the computer-implemented method further includes re-triggering localization using at least one of frequency channel overlapping, frequency channel stepping, multi-channel wide band, and ultra-wide band for at least one of time of flight and signal strength techniques upon the wireless network being configured as the first network architecture.

In one example, the wireless network continues to be configured as the first network architecture if no sustained change in signal strength occurs for the least two nodes of the wireless network.

In another embodiment, a computer readable storage medium containing executable computer program instructions which when executed by a device cause said device to perform a method for localization of nodes in a wireless network. The method includes causing, with processing logic of a hub, the wireless network having nodes to be configured as a first network architecture for a first time period for localization. The method further includes determining, with the processing logic of the hub, localization of at least two nodes using at least one of frequency channel overlapping communications, frequency channel stepping communications, multi-channel wide band communications, and ultra-wide band communications for at least one of time of flight and signal strength techniques. The method further includes causing, with the processing logic of the hub, the wireless network to be configured in a second network architecture having narrow-band communications upon completion of localization.

In one example, the method further includes receiving, with the processing logic of the hub, information from at least one of the nodes with the information used to determine if any sustained change in signal strength occurs.

In one example, the method further includes determining, with the processing logic of the hub, whether there has been a sustained change in signal strength of at least one node of the wireless network.

In one example, the method further includes causing, with the processing logic of the hub, the wireless network to be configured as the first network architecture for a second time period when there has been a sustained change in signal strength of at least one node of the wireless network.

In one example, the method further includes re-triggering localization using at least one of frequency channel overlapping, frequency channel stepping, multi-channel wide band, and ultra-wide band for at least one of time of flight and signal strength techniques upon the wireless network being configured as the first network architecture.

In another embodiment, an apparatus for providing a wireless network architecture includes a memory for storing instructions, one or more processing units to execute instructions for localization of nodes in the wireless network architecture, and radio frequency (RF) circuitry including multiple antennas to transmit and receive communications in the wireless network architecture. The RF circuitry transmits communications to a plurality of sensor nodes each having a wireless device with a transmitter and a receiver to enable bi-directional communications with the RF circuitry of the apparatus in the wireless network architecture. The one or more processing units are configured to execute instructions to cause the sensor nodes to be configured as a first network architecture for a first time period for localization, to determine localization of at least two nodes using at least one of frequency channel overlapping communications, frequency channel stepping communications, multi-channel wide band communications, and ultra-wide band communications for at least one of time of flight and signal strength techniques, and to cause the wireless network architecture to be configured in a second network architecture having narrow-band communications upon completion of localization.

In one example, the one or more processing units are configured to execute instructions to receive information from at least one of the nodes with the information used to determine if any sustained change in signal strength occurs.

In one example, the one or more processing units are configured to execute instructions to determine whether there has been a sustained change in signal strength of at least one node of the wireless network architecture.

In one example, the one or more processing units are configured to execute instructions to cause the wireless network to be configured as the first network architecture for a second time period when there has been a sustained change in signal strength of at least one node of the wireless network architecture.

In one example, the one or more processing units are configured to execute instructions to re-trigger localization using at least one of frequency channel overlapping, frequency channel stepping, multi-channel wide band, and ultra-wide band for at least one of time of flight and signal strength techniques upon the wireless network architecture being configured as the first network architecture.

In one example, the one or more processing units are configured to execute instructions to receive communications including captured images from at least two nodes, to perform image processing for the captured images and machine learning techniques to determine whether the at least two sensor nodes that are being monitored are sensing images of the same scene and are likely in the same room.

In one example, the one or more processing units are configured to provide instructions to cause periodic illumination of a first sensor to function as a strobe and to cause photodetectors of a second sensor to detect illumination.

In one example, the one or more processing units are configured to execute instructions to analyze the detected illumination of the second sensor and to determine whether an optical path can be detected between the first and second sensors which indicates whether an opaque wall exists between the first and second sensors.

In another example, the one or more processing units are configured to execute instructions to receive orientation data from the sensor nodes, to determine orientation for the sensor nodes using the orientation data, and to determine whether each sensor node is located on a wall, a floor, a ceiling, or other location based on the orientation data and localization information.

In one example, the one or more processing units are configured to execute instructions to estimate a first distance from the apparatus to a sensor node using time of flight information, to estimate a second distance from the apparatus to the sensor node using signal strength information, and to determine whether a wall is present in a signal path between the apparatus and the sensor node.

In one example, the one or more processing units are configured to execute instructions to determine whether a wall is present in a signal path between the apparatus and the sensor node based on a comparison of the first distance and the second distance.

In another example, the comparison indicates a presence of a wall in the signal path between the apparatus and the sensor node when the first distance that is estimated using time of flight information is significantly less than the second distance that is estimated using signal strength information.

In another example, the comparison indicates a presence of a reflection in the signal path between the apparatus and the sensor node when the second distance that is estimated using signal strength information is significantly less than the first distance that is estimated using time of flight information.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system, comprising:
    a hub having one or more processing units and RF circuitry for transmitting and receiving communications in the wireless asymmetric network; and
    a plurality of sensor nodes each having a wireless device with a transmitter and a receiver to enable bi-directional communications with the hub in the wireless asymmetric network architecture, wherein the one or more processing units of the hub to execute instructions to configure the system with a tree architecture for communications between the hub and the plurality of sensor nodes, to detect a change in range or position of at least one sensor node, and to configure the system temporarily with a mesh-based architecture for determining location information for the plurality of sensor nodes based on detecting a change in range or position.

2. The system of claim 1, wherein the hub is powered by a mains electrical source and the plurality of sensor nodes are each powered by a battery source to form the wireless asymmetric network.

3. The system of claim 1, wherein the one or more processing units of the hub execute instructions to configure the system with the tree architecture for communications at a first frequency level between the hub and the plurality of sensor nodes subsequent to determining location information while the system is configured with the temporary mesh-based architecture for communications at a second frequency level.

4. The system of claim 1, wherein the one or more processing units to execute instructions to determine location information for the plurality of sensor nodes based on triangulating from distances measured via time of flight information that is associated with communications occurring during the temporary mesh-based architecture.

5. The system of claim 1, wherein the one or more processing units to execute instructions to determine location information for the plurality of sensor nodes based on triangulating from distances measured via strength of signal information that is associated with communications.

6. The system of claim 1, wherein the system is configured temporarily with a mesh-based architecture for a time period that is sufficient for localization of the sensor nodes.

7. The system of claim 1, wherein the one or more processing units of the hub to execute instructions to determine absolute location information for the sensor nodes based on the location information for the plurality of sensor nodes and an absolute location of the hub or at least one of the sensor nodes.

8. An apparatus, comprising:
    a memory for storing instructions;
    one or more processing units to execute instructions for localization of nodes in a wireless network architecture; and
    radio frequency (RF) circuitry to transmit communications to and receive communications from a plurality of sensor nodes each having a wireless device with a transmitter and a receiver to enable bi-directional communications with the RF circuitry of the apparatus in the wireless network architecture, wherein the one or more processing units execute instructions to configure the wireless network architecture with a tree architecture for communications between the apparatus and the plurality of sensor nodes, to detect a change in range or position of at least one of the plurality of sensor nodes, and to configure the wireless network architecture temporarily with a mesh-based architecture for determining location information for the plurality of sensor nodes based on detecting a change in range or position.

9. The apparatus of claim 8, wherein the apparatus is powered by a mains electrical source and the plurality of sensor nodes are each powered by a battery source to form the wireless network architecture.

10. The apparatus of claim 8, wherein the one or more processing units execute instructions to configure the wireless network architecture with the tree architecture for communications between the apparatus and the plurality of sensor nodes subsequent to determining location information while the wireless network architecture is configured with the temporary mesh-based architecture.

11. The apparatus of claim 8, wherein the one or more processing units execute instructions to determine location information for the plurality of sensor nodes based on triangulating from distances measured via time of flight information that is associated with communications occurring during the temporary mesh-based architecture.

12. The apparatus of claim 8, wherein the one or more processing units execute instructions to determine location information for the plurality of sensor nodes based on triangulating from distances measured via strength of signal information that is associated with communications.

13. The apparatus of claim 8, wherein the wireless network architecture is configured temporarily with a mesh-based architecture for a time period that is sufficient for localization.

14. The apparatus of claim 8, wherein the one or more processing units execute instructions to determine absolute location information for the sensor nodes based on the location information for the plurality of sensor nodes and an absolute location of the apparatus or at least one of the sensor nodes.

15. A computer-implemented method for localization of nodes in a wireless network, comprising:
  causing, with processing logic of a hub, the wireless network having nodes to be configured as a mesh-based network architecture for a time period;
  determining, with the processing logic of the hub, localization of at least two nodes using at least one of time of flight and signal strength techniques;
  upon localization of the at least two nodes being complete, terminating, with the processing logic of the hub, time of flight measurements if any time of flight measurements are occurring; and
  causing, with the processing logic of the hub, the wireless network to be configured in a tree based or tree-like network architecture upon completion of localization.

16. The computer-implemented method of claim 15, further comprising:
  receiving, with the processing logic of the hub, information from at least one of the nodes used to determine if any sustained change in signal strength occurs.

17. The computer-implemented method of claim 16, further comprising:
  determining, with the processing logic of the hub, whether there has been a sustained change in signal strength of at least one node of the wireless network.

18. The computer-implemented method of claim 17, further comprising:
  causing, with the processing logic of the hub, the wireless network to be configured as a mesh-based network architecture for a time period when there has been a sustained change in signal strength of at least one node of the wireless network.

19. The computer-implemented method of claim 18, further comprising:
  retriggering localization using at least one of time of flight and signal strength techniques upon the wireless network being configured as a mesh-based network architecture.

20. The computer-implemented method of claim 17, wherein the wireless network continues to be configured as a tree based or tree-like network architecture if no sustained change in signal strength occurs for the least two nodes of the wireless network.

* * * * *